US011216843B1

(12) United States Patent
Roy Chowdhury et al.

(10) Patent No.: US 11,216,843 B1
(45) Date of Patent: Jan. 4, 2022

(54) RANKED RELEVANCE RESULTS USING MULTI-FEATURE SCORING RETURNED FROM A UNIVERSAL RELEVANCE SERVICE FRAMEWORK

(71) Applicant: Groupon, Inc., Chicago, IL (US)

(72) Inventors: Amber Roy Chowdhury, Bellevue, WA (US); Abhaya Parthy, Palo Alto, CA (US); Lei Tang, Jersey City, NJ (US); Sri Subramaniam, San Jose, CA (US)

(73) Assignee: Groupon, Inc., Chicago, IL (US)

( * ) Notice: Subject to any disclaimer, the term of this patent is extended or adjusted under 35 U.S.C. 154(b) by 602 days.

(21) Appl. No.: 14/824,922

(22) Filed: Aug. 12, 2015

Related U.S. Application Data

(60) Provisional application No. 62/141,063, filed on Mar. 31, 2015, provisional application No. 62/038,050, filed on Aug. 15, 2014.

(51) Int. Cl.
  *G06Q 30/02* (2012.01)
  *G06F 16/248* (2019.01)
  *G06F 16/2457* (2019.01)

(52) U.S. Cl.
  CPC ....... *G06Q 30/0256* (2013.01); *G06F 16/248* (2019.01); *G06F 16/24578* (2019.01)

(58) Field of Classification Search
  CPC .......... G06Q 30/0256; G06F 16/24578; G06F 16/248
  See application file for complete search history.

(56) References Cited

U.S. PATENT DOCUMENTS

| | | | |
|---|---|---|---|
| 7,406,434 B1 | 7/2008 | Chang et al. | |
| 8,126,891 B2 | 2/2012 | Laxman et al. | |
| 8,819,004 B1 | 8/2014 | Petcherski et al. | |
| 9,412,127 B2 | 8/2016 | Dumon et al. | |
| 9,779,441 B1 * | 10/2017 | Jadhav | G06Q 30/0627 |
| 10,032,180 B1 * | 7/2018 | Shariff | G06Q 30/0202 |
| 2002/0010769 A1 | 1/2002 | Kippenhan et al. | |
| 2002/0059204 A1 | 5/2002 | Harris | |
| 2003/0088544 A1 * | 5/2003 | Kan | G06F 17/30867 |
| 2005/0071741 A1 | 3/2005 | Acharya et al. | |
| 2008/0033910 A1 | 2/2008 | Richards et al. | |
| 2010/0094878 A1 | 4/2010 | Soroca et al. | |
| 2011/0078049 A1 | 3/2011 | Rehman et al. | |
| 2012/0059707 A1 | 3/2012 | Goenka et al. | |
| 2012/0078881 A1 | 3/2012 | Crump et al. | |
| 2012/0084277 A1 | 4/2012 | Barve et al. | |
| 2013/0173571 A1 | 7/2013 | Chen et al. | |
| 2014/0236708 A1 * | 8/2014 | Wolff | G06Q 30/0207 705/14.41 |
| 2015/0066594 A1 | 3/2015 | Li et al. | |

(Continued)

OTHER PUBLICATIONS

U.S. Patent Application filed Aug. 12, 2015, 59 pages, entitled "Universal Relevance Service Framework", first named inventor Amber Roy Chowdhury, U.S. Appl. No. 14/824,912.

(Continued)

*Primary Examiner* — Yehdega Retta
(74) *Attorney, Agent, or Firm* — Alston & Bird LLP

(57) ABSTRACT

In general, embodiments of the present invention provide systems, methods and computer readable media for a universal relevance service framework for ranking and personalizing items.

19 Claims, 18 Drawing Sheets

Exemplary User-Deal Relevance Using Similarity Calculation and Trained Models

(56) References Cited

U.S. PATENT DOCUMENTS

2015/0142787 A1    5/2015   Kimmerling
2015/0269609 A1    9/2015   Mehanian et al.
2016/0171540 A1    6/2016   Mangipudi et al.
2017/0154356 A1    6/2017   Trevisiol et al.

OTHER PUBLICATIONS

U.S. Appl. No. 15/393,721, filed Dec. 29, 2016.
U.S. Appl. No. 14/824,934, filed Aug. 12, 2015.
U.S. Appl. No. 14/824,929, filed Aug. 12, 2015.
Conjugate Prior. [retrieved Mar. 28, 2017], Retrieved via the Internet Archive Wayback Machine at <URL: http://web.archive.org/web/20150324191740/https://en.wikipedia.org/wiki/Conjugate_prior> (Mar. 24, 2015), 6 pages.
Elasticsearch Server, a practical guide to building fast, scalable, and flexible search solutions (first edition Feb. 2013, second edition Apr. 2014). See pp. 15-17.

\* cited by examiner

RANKED RELEVANCE RESULTS USING MULTI-FEATURE SCORING RETURNED FROM A UNIVERSAL RELEVANCE SERVICE FRAMEWORK

CROSS-REFERENCE TO RELATED APPLICATIONS

This application claims the benefit of U.S. Provisional Application No. 62/141,063, entitled "RANKED RELEVANCE RESULTS USING MULTI-FEATURE SCORING RETURNED FROM A UNIVERSAL RELEVANCE SERVICE FRAMEWORK," and filed Mar. 31, 2015; and U.S. Provisional Application No. 62/038,050, entitled "UNIVERSAL RELEVANCE SYSTEM," and filed Aug. 15, 2014, of which the entire contents of both are hereby incorporated by reference.

This application is related to the following concurrently filed, co-pending, and commonly assigned applications: U.S. application Ser. No. 14/824,912, entitled "UNIVERSAL RELEVANCE SERVICE FRAMEWORK"; U.S. application Ser. No. 14/824,929, entitled "ENFORCING DIVERSITY IN RANKED RELEVANCE RESULTS RETURNED FROM A UNIVERSAL RELEVANCE SERVICE FRAMEWORK"; and U.S. application Ser. No. 14/824,934, entitled "PERSONALIZATION OF RANKED RELEVANCE RESULTS RETURNED FROM A UNIVERSAL RELEVANCE SERVICE FRAMEWORK."

FIELD

Embodiments of the invention relate, generally, to a universal relevance service framework for ranking and personalizing items.

BACKGROUND

Current methods for identifying offerings of most interest (i.e., most relevance) to consumers by using collected data describing attributes of the consumers and items being offered to the consumers for purchase exhibit a plurality of problems that make current systems insufficient, ineffective and/or the like. Through applied effort, ingenuity, and innovation, solutions to improve such methods have been realized and are described in connection with embodiments of the present invention.

SUMMARY

In general, embodiments of the present invention provide herein systems, methods and computer readable media for a universal relevance service framework for ranking and personalizing items.

Typical relevance systems are implemented to optimize their performance for various aspects of the business. For example, batch systems typically support business use cases such as targeted electronic messaging to consumers about available offerings. Real time systems typically support business use cases such as responding to search queries. Separate code bases leads to duplicate efforts and over-diversification of both the architecture and production systems. Incremental improvements to each code base in response to short business focus may lead to high development and operational costs.

In embodiments, a relevance service framework has been implemented to address these problems as well as to be able to scale gracefully as the business grows by horizontal scaling without practical limitation to numbers of item listings. In addition, the framework architecture meets performance requirements by supporting dynamic offerings whose attributes change on a real-time basis.

In embodiments, the relevance service is a plug-in framework to enable seamless integration of evolving code (e.g., personalization and relevance ranking) being developed in-house as well as by third parties. In embodiments, the framework meets architectural goals of performance and scalability, extensibility, accountability, and manageability while providing support for both real time and batch processing.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

Figure 17:
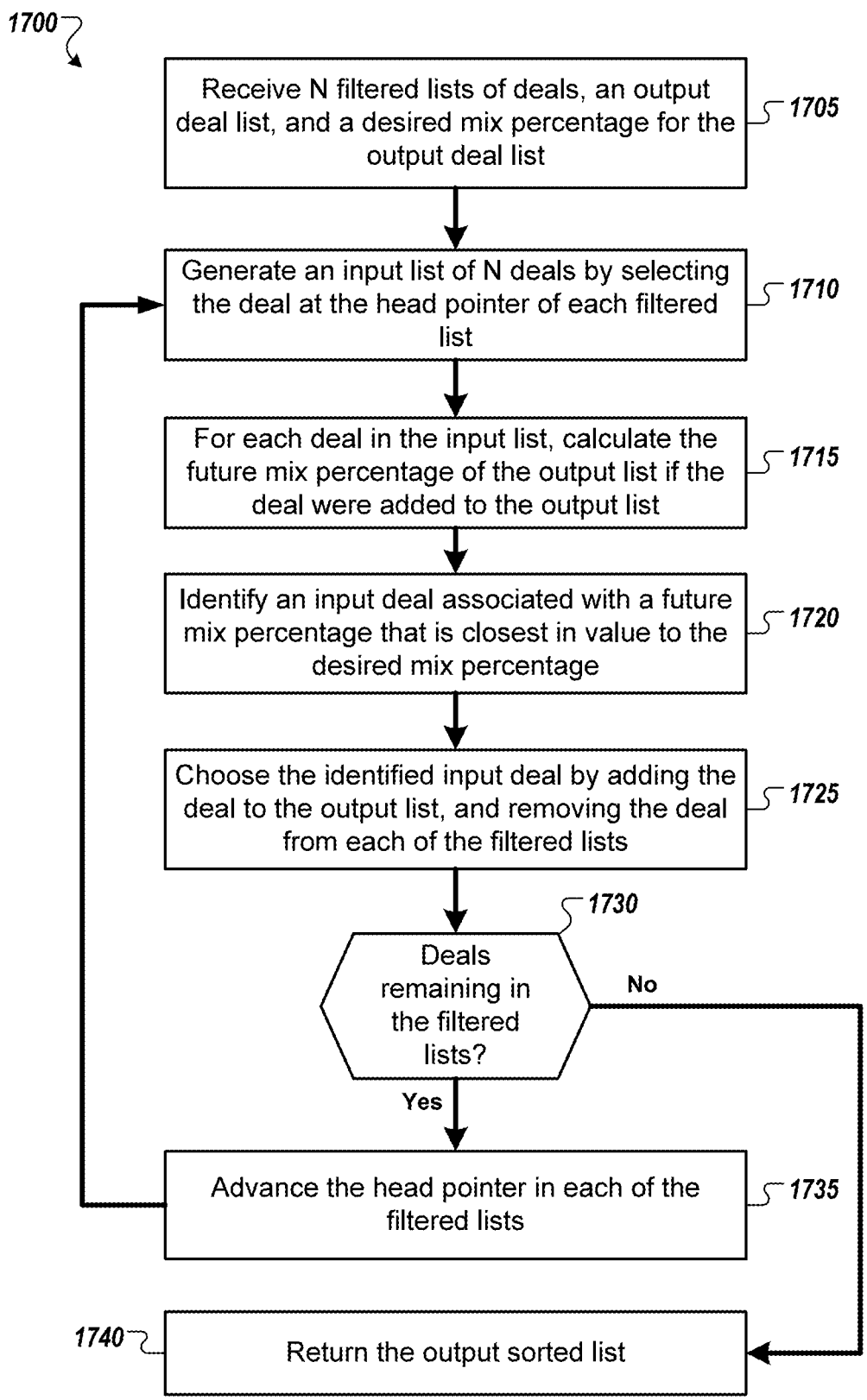
Figure 18:
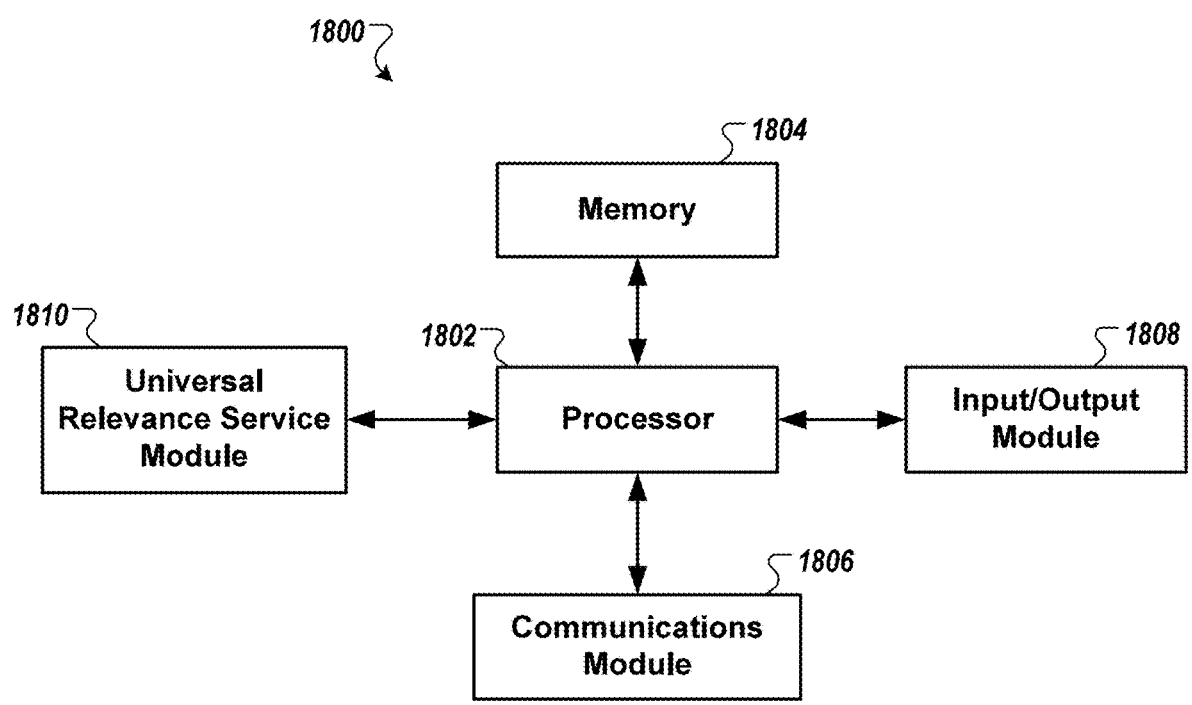

FIG. 17 is a flow diagram of an example method 1700 for selecting items to add to an output sorted list to optimize the mix percentage of the output sorted list in accordance with some embodiments discussed herein; and FIG. 18 illustrates a schematic block diagram of circuitry that can be included in a computing device, such as a universal relevance service framework, in accordance with some embodiments discussed herein.

DETAILED DESCRIPTION

The present invention now will be described more fully hereinafter with reference to the accompanying drawings, in which some, but not all embodiments of the invention are shown. Indeed, this invention may be embodied in many different forms and should not be construed as being limited to the embodiments set forth herein; rather, these embodiments are provided so that this disclosure will satisfy applicable legal requirements. Like numbers refer to like elements throughout.

As described herein, system components can be communicatively coupled to one or more of each other. Though the components are described as being separate or distinct, two or more of the components may be combined into a single process or routine. The component functional descriptions provided herein including separation of responsibility for distinct functions is by way of example. Other groupings or other divisions of functional responsibilities can be made as necessary or in accordance with design preferences.

As used herein, the terms "data," "content," "information" and similar terms may be used interchangeably to refer to data capable of being captured, transmitted, received, displayed and/or stored in accordance with various example embodiments. Thus, use of any such terms should not be taken to limit the spirit and scope of the disclosure. Further, where a computing device is described herein to receive data from another computing device, the data may be received directly from the another computing device or may be received indirectly via one or more intermediary computing devices, such as, for example, one or more servers, relays, routers, network access points, base stations, and/or the like. Similarly, where a computing device is described herein to send data to another computing device, the data may be sent directly to the another computing device or may be sent indirectly via one or more intermediary computing devices, such as, for example, one or more servers, relays, routers, network access points, base stations, and/or the like.

As used herein, the term "promotion and marketing service" may refer, without limitation, to a service that is accessible via one or more computing devices and is operable to provide example promotion and/or marketing services on behalf of one or more providers that are offering one or more instruments that are redeemable for goods, services, experiences and/or the like. The promotion and marketing service is further configured to illustrate or otherwise inform one or more consumers of the availability of one or more instruments in the form of one or more impressions. In some examples, the promotion and marketing service may also take the form of a redemption authority, a payment processor, a rewards provider, an entity in a financial network, a promoter, an agent and/or the like. As such, the service is, in some example embodiments, configured to present one or more promotions via one or more impressions, accept payments for promotions from consumers, issue instruments upon acceptance of an offer, participate in redemption, generate rewards, provide a point of sale device or service, issue payments to providers and/or or otherwise participate in the exchange of goods, services or experiences for currency, value and/or the like.

As used herein, the term "provider" may be used to refer, without limitation, to a merchant, business owner, consigner, shopkeeper, tradesperson, vender, operator, entrepreneur, agent, dealer, organization or the like that is in the business of a providing a good, service or experience to a consumer, facilitating the provision of a good, service or experience to a consumer and/or otherwise operating in the stream of commerce. For example, a provider may be in the form of a running company that sells attire that is generally used by a person who runs or participates in athletic activities.

As used herein, the terms "promotion," "offer," "deal" and similar terms may be used interchangeably to refer, without limitation, to any type of offered, presented or otherwise indicated reward, discount, coupon, credit, incentive, discount, media or the like that is indicative of a promotional value or the like that upon purchase or acceptance results in the issuance of an instrument that may be used toward at least a portion of the purchase of particular goods, services and/or experiences defined by the promotion. An example promotion, using the aforementioned running company as the example provider, is $25 for $50 toward running shoes. In some examples, the promotion defines an accepted value (e.g., a cost to purchase the promotion), a promotional value (e.g., the value of the resultant instrument beyond the accepted value), a residual value (e.g., the value upon return or upon expiry of one or more redemption parameters), one or more redemptions parameters and/or the like. For example, and using the running company promotion as an example, the accepted value is $25 and the promotional value is $50. In this example, the residual value may be equal to the accepted value.

As used herein, the term "instrument" may be used, without limitation, to refer to any type of gift card, tender, electronic certificate, medium of exchange, voucher, or the like that embodies the terms of the promotion from which the instrument resulted and may be used toward at least a portion of the purchase, acquisition, procurement, consumption or the like of goods, services and/or experiences. In some examples, the instrument may take the form of tender that has a given value that is exchangeable for goods, services and/or experiences and/or a reduction in a purchase price of a particular good, service or experience. In some examples, the instrument may have multiple values, such as accepted value, a promotional value and/or a residual value. For example, using the aforementioned running company as the example provider, an electronic indication in a mobile application that shows $50 of value to spend at the running company. In some examples, the accepted value of the instrument is defined by the value exchanged for the instrument. In some examples, the promotional value is defined by the promotion from which the instrument resulted and is the value of the instrument beyond the accepted value. In some examples, the residual value is the value after redemption, the value after the expiry or other violation of a redemption parameter, the return or exchange value of the instrument and/or the like.

As used herein, the term "impression" may be used, without limitation, to refer to a communication, a display, or other perceived indication, such as a flyer, print media, e-mail, text message, application alert, mobile applications, other type of electronic interface or distribution channel and/or the like, of one or more promotions. For example, and using the aforementioned running company as the example provider, an e-mail communication sent to consumers that indicates the availability of a $25 for $50 toward running shoes promotion.

As used herein, the terms "user," "consumer," and "customer" may be used interchangeably to refer, without limitation, to a client, customer, purchaser, shopper, user or the like who may be in the position to or does exchange value for one or more instruments under the terms defined by the one or promotions. For example, and using the aforementioned running company as the example provider, an individual who is interested in purchasing running shoes.

It is appreciated while various embodiments discussed herein refer to data describing promotions, promotion offers, consumers, and their respective attributes, the techniques discussed herein may also be applicable to other types of data or other objects or entities.

A promotion and marketing service is an example of a business for which a relevance system is a critical component to unlock business growth and enable collaborative personalization innovation. Relevance systems identify offerings of most interest (i.e., most relevance) to consumers by using collected data describing attributes of the consumers and items being offered to the consumers for purchase. Receiving relevant offerings increases the likelihood that a consumer will make purchases, and also increases the likelihood that the consumer will establish and continue a relationship with the business.

Typical relevance systems are implemented to optimize their performance for various aspects of the business. For example, batch systems typically support business use cases such as targeted electronic messaging to consumers about available offerings. Real time systems typically support business use cases such as responding to search queries (e.g., a consumer interacting with a mobile application sends a query to locate restaurant deals in the consumer's vicinity). Separate code bases to support batch and real time systems leads to duplicate efforts and over-diversification of both the architecture and production systems. Incremental improvements to each code base in response to short business focus may lead to high development and operational costs. In embodiments, a relevance system architecture has been implemented to address these problems as well as to be able to scale gracefully as the business grows by horizontal scaling without practical limitation to numbers of item listings. In addition, the architecture meets performance requirements by supporting dynamic offerings whose attributes change on a real-time basis.

In embodiments, the relevance service is a plug-in framework to enable seamless integration of evolving code (e.g., personalization and relevance ranking) being developed in-house as well as by third parties. In embodiments, the framework meets architectural goals of performance and scalability, extensibility, accountability, and manageability while providing support for both real time and batch processing.

Typical batch relevance systems are based on a computing model that applies relevance algorithms for all users and all offerings (deals); conceptually, this algorithm, iterating over all users and again over all deals, may be implemented as a series of pipelines consisting of multiple Hadoop MapReduce jobs. This means that accessing the results of a particular batch relevance computation will be limited to the requestor of the computation.

In embodiments, the relevance service makes use of a continuous background computation model. Data sources used for batch (and real time indexing) are all available as streams of data. These streams can be used to trigger re-computation of affected relevance scores. For example, receiving updated purchase information for a user can trigger the computation of deal scores for that user. Receiving new information about how many units of a particular deal have been sold can trigger recalculation of scores for that particular deal. This then effectively becomes a model of background computation for partial scores, more specifically those scores that are independent of real time information that come with a request (such as location, time of day, etc.).

As a result, a background computation system always contains all the scores and rankings necessary to perform the functions that currently depend on batch, e.g., Email send & push notifications. In addition, the background computation system can push these partial scores and rankings periodically into the real time system (e.g., ElasticSearch index) which can use them as is and doesn't have to compute them itself. This has the potential of significantly reducing latency for real time processing.

Additionally, in embodiments, the relevance system can decouple signal processing from servicing relevance computation requests by including a feature engineering infrastructure and real time data stores. Additionally, on-demand computation also has the side-effect that active users leverage compute resources more than non-active users. This enables performance improvements over typical systems based on models that treat all users equivalently, expending compute resources uniformly even if a user has not purchased anything in months.

Figure 1:
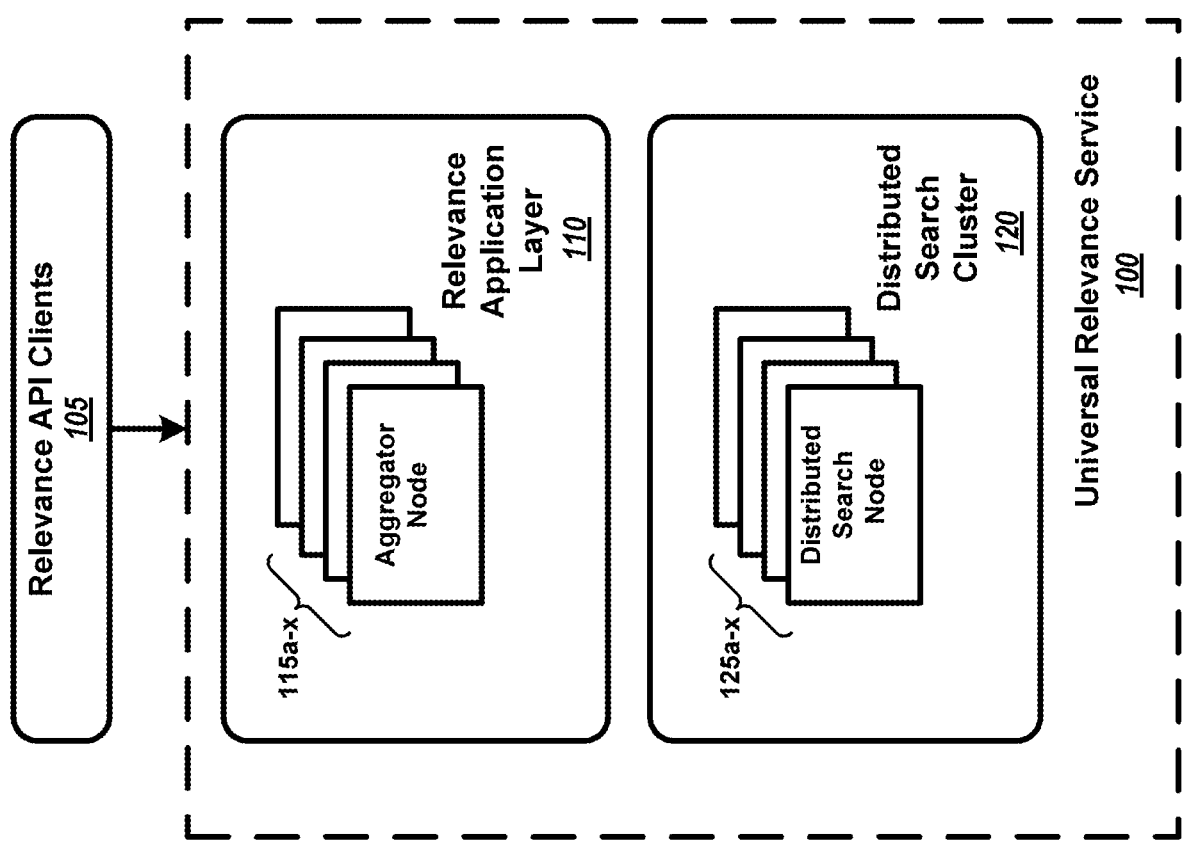
FIG. 1 illustrates an example system that can be configured to implement a real time universal relevance service framework in accordance with some embodiments discussed herein.

FIG. 1 illustrates an example system that can be configured to implement a real time universal relevance service framework 100. In embodiments, system 100 comprises two separate layers: a relevance application layer 110 and a distributed search layer 120. Plugins written against a relevance framework Software Development Kit (SDK) may be deployed and executed in both layers.

In embodiments, relevance application layer 110 is the user-facing component and includes one or more aggregator nodes 115*a-x* that are fronted by at least one load balancer. Relevance API clients 105 only will interface with these nodes. Aggregator nodes 115*a-x* thus expose the relevance service API and implement authorization and rate-limiting of clients 105 as well as perform a portion of the relevance processing algorithms (e.g., sorting and ranking) Plugins that execute in this layer include re-ranking and co-ranking plugins, some of which will be described in detail below with reference to FIGS. 6-17.

In embodiments, distributed search cluster 120 includes one or more distributed search nodes 125*a-x* and is internal to the system 100 (i.e., is not available for direct interaction from the relevance API clients 105). In various embodiments, distributed search cluster 120 may be implemented based on one or a combination of distributed search servers (e.g., open-source distributed search servers ElasticSearch, Solr, and Apache Lucene). The choice of distributed search server underlying the distributed search cluster 120 would be apparent to others having ordinary skill in the art. In embodiments, the universal relevance service framework code is deployed as distributed search server plugins that implement functions such as item ranking/scoring, some of which will be described in detail below with reference to FIGS. 6-17.

Figure 2:
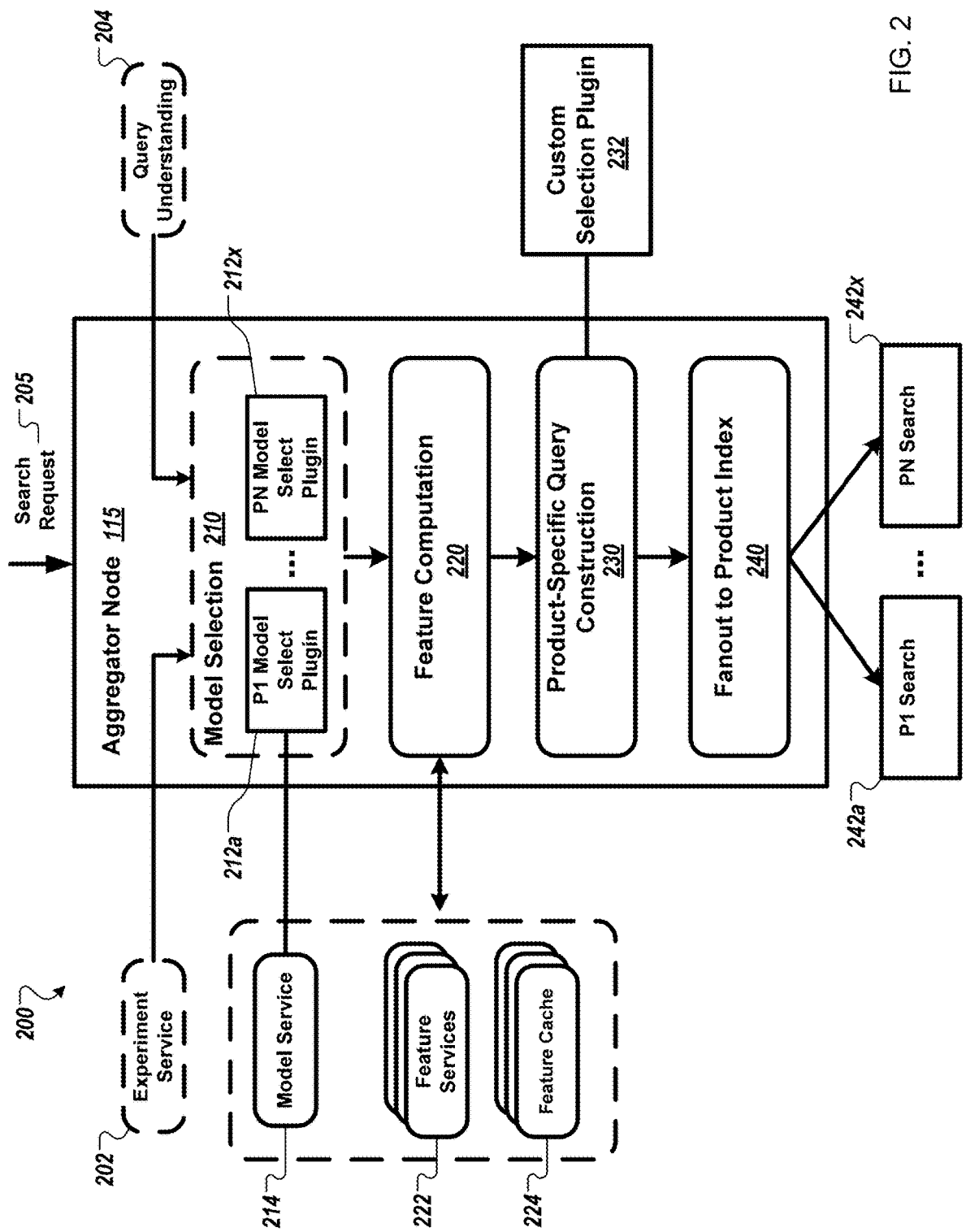
FIG. 2 illustrates the logical flow of processing by an aggregator node in response to receiving a search request from a relevance API client in accordance with some embodiments discussed herein.

FIG. 2 illustrates the logical flow of processing by an aggregator node 115 in response to receiving a search request from a relevance API client 105. The processing results in generating one or more product-specific searches to input to the distributed search cluster 120. In some embodiments, a product-specific search is a document describing features and selection criteria to be used in searching a product search index. In various embodiments, an exemplary search request 105 may be a search query that was generated on behalf of a particular consumer for products (e.g., promotion offerings) that are currently available to the consumer. In embodiments, the search query may further include one or a combination of attributes describing requested products (e.g., promotion category for promotion offerings) and/or attributes describing the particular consumer (e.g., consumer location).

In some embodiments, search queries have been often known to contain synonyms (e.g., "mechanic" may be a synonym for categories "local Automotive" or "Auto Repair"; "tacos" may be a synonym for categories "local Food and Drink" or "Restaurants" or "Mexican"). If a direct match to the terms in a search query is not found, in some embodiments the system 100 may invoke a generic query understanding service 204 to provide a more accurate categorization of the search request. In some embodiments, analysis by a generic query understanding service 204 may include, for example, identifying category attributes in a search request by identifying queries for similar previously purchased items and analyzing the categories of items clicked on for those previous queries. In some embodiments, analysis by a generic understanding service 204 may include machine learning models.

In some embodiments, a search request 205 may have been generated from an experiment (e.g., A/B testing of new features and/or algorithms). Thus, in some embodiments, the system 115 may invoke an experiment service 202 to receive configuration data describing experiment-specific processing constraints (e.g., algorithm changes, logging changes).

In some embodiments, the system 115 selects 210 one or more models upon which to base its product-specific query construction. In some embodiments, the system receives product-specific models and their respectively associated configurations in response to invoking a model service 214. In some embodiments, model selection 210 is configurable and extensible because each product-specific model selection is respectively described and implemented by a separate plugin 212a-212x.

In some embodiments, implementing feature computation 220 includes retrieving features described by the product models, computing an ordered feature list from the retrieved features, and initiating feature computation of document-independent feature data (e.g., consumer feature data in the case of a product search document). In some embodiments in which the retrieved features were specified using multiple product-specific models, computing the ordered feature list includes deduplicating features across the multiple models. In some embodiments, features may be retrieved by accessing at least one feature cache 224 either directly and/or by invoking feature services 222.

In embodiments, product-specific query construction 230 includes applying product-specific selection logic based on one or more custom selection plugins 232. In some embodiments, product-specific query construction includes ordering features using one or a combination of per-product selection, filters, facets, and groupings according to one or a combination of inbuilt system predicates (e.g., base predicates such as categories from mandatory schema; spatial predicates, and temporal predicates). In some embodiments, explicit ordering of the predicates may be specified by the product-specific selection logic. In some embodiments, query construction for multiple products may be executed in parallel.

In embodiments, the system 115 generates and sends 240 one or more product-specific searches to the distributed search cluster 120. In some embodiments, each product-specific search may include embedded data to be used in ranking/scoring of search results. In some embodiments in which the distributed search cluster supports a multi-query interface, the system generates a multi-query that includes multiple product searches 242a-x that may be executed in parallel by the distributed search cluster 120 against the product index.

Figure 3:
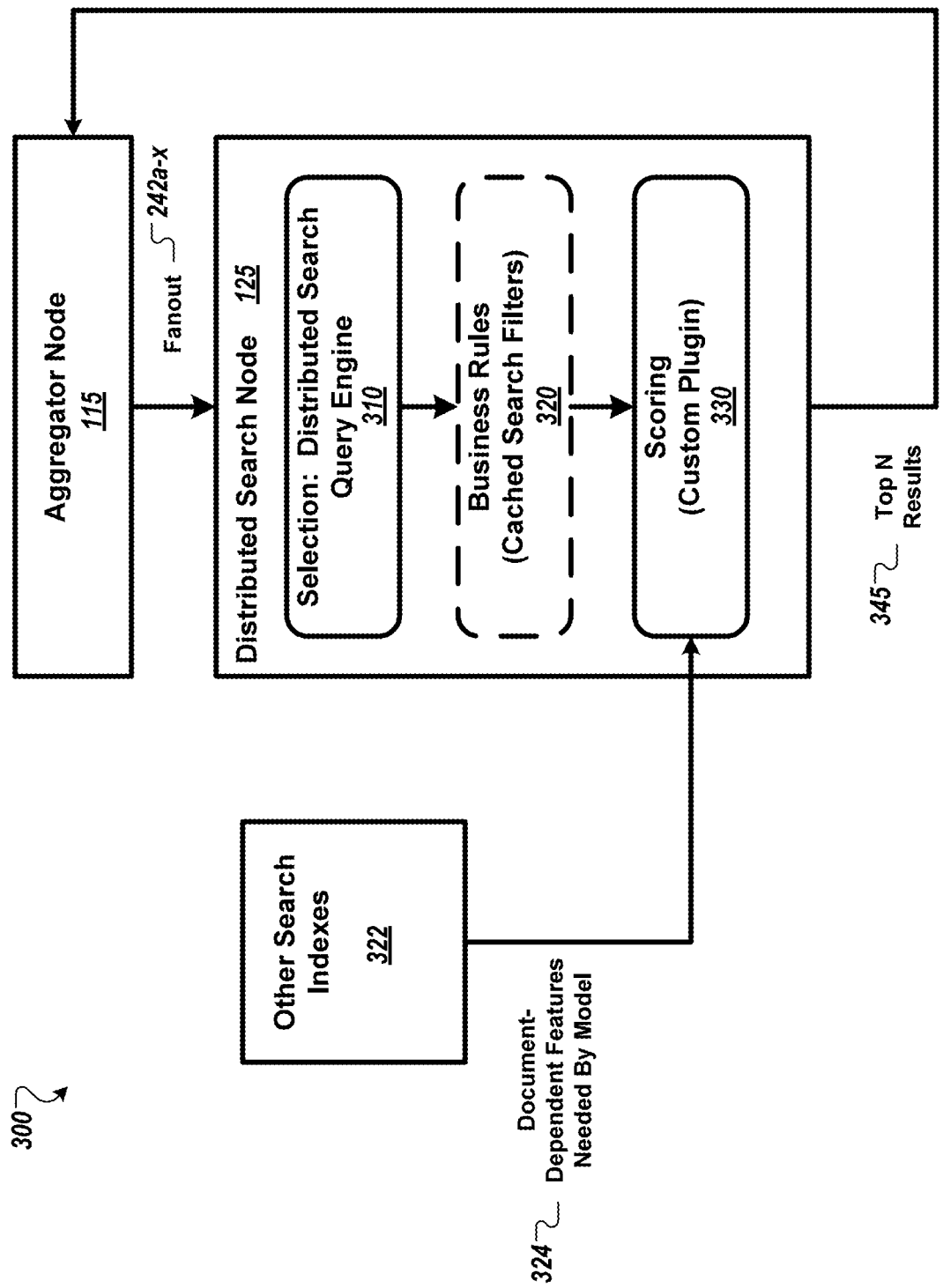
FIG. 3 illustrates the logical flow of processing by a distributed search node in response to receiving a multi-query search from an aggregator node in accordance with some embodiments discussed herein.

FIG. 3 illustrates the logical flow of processing by a distributed search node 125 in response to receiving a multi-query search 242a-x from an aggregator node 115. In some embodiments, processing of a multi-query search may be sharded to be processed in parallel. In some embodiments, the distributed search node query engine implements selection of items 310 based on the data in the received search documents.

In some embodiments, the selected items optionally may be filtered according to item-level business rules 320.

In some embodiments, the selected items may be scored and ranked based on feature data that may come from multiple sources including one or a combination of the search payload (document-independent data such as context and request data); document-specific data; and document-dependent features 324 retrieved from other search indexes 322 that may be local or may be accessed through feature services 222. In some embodiments, ranking/scoring is implemented by a custom plugin 330.

In embodiments, the top N ranked results 345 are returned to the aggregator note 115 that initiated the multi-query search. In some embodiments in which processing is implemented using sharding, the top N ranked results 345 are selected during rollup of the shard ranking results. In some embodiments, the value of N may be configurable and fetch limits may be applied (for example, fetch limits may be applied per client and/or per context).

In some embodiments, the top N results rankings may be adjusted in the aggregator node 115 by per-product and/or cross-product re-ranking and co-ranking.

Figure 4:
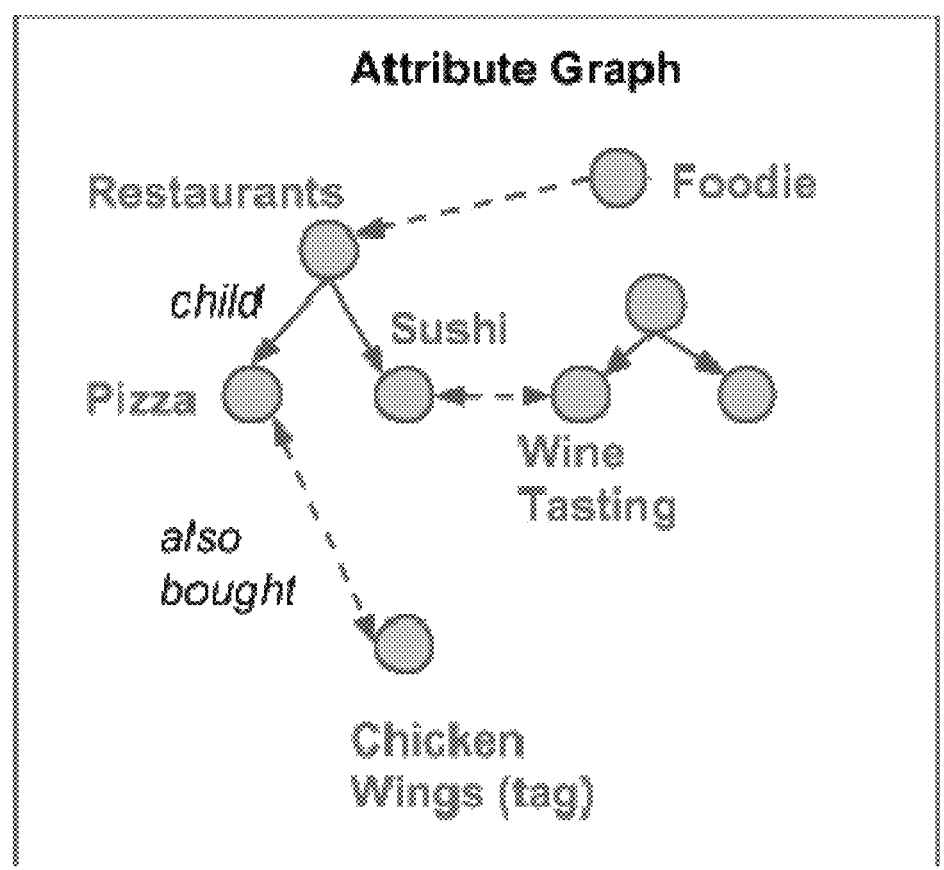
FIG. 4 illustrates an exemplary attribute graph representing relationships among attributes in accordance with some embodiments discussed herein.

FIG. 4 illustrates an exemplary attribute graph 400 representing relationships among attributes. In embodiments, an attribute is a structured tag associated with a user and/or item. In some embodiments in which items may be promotions, coupons, and/or context and users may be consumers of those items, exemplary attributes may be product categories and subcategories, gender, and age-group. An attribute graph 400 may include semantic edges (e.g., hierarchy, related-to) as well as edges formed through collaborative filtering.

In embodiments, an attribute graph may be used in a variety of ways by a universal relevance service framework 100. In embodiments, a primary use of the attribute graph by a universal relevance service framework 100 may be for ranking and scoring (e.g., scoring plugin 330 in distributed search node 125 as referenced in FIG. 3). Additionally and/or alternatively, an attribute graph may be used in query understanding (e.g., by a query understanding system 204 as referenced in FIG. 2); to increase browse/search recall (e.g., use the graph to tag items with several categories to lead to an increase in browse and search recall); browse merchandising (e.g., analysis of co-purchases of items to generate a feature-to-feature collaborative filtering matrix); user profile creation (e.g., use the graph to generate an extended user feature vector based on feature-to-feature collaborative filtering); selecting personalized interfaces for users; search engine marketing (SEM) keyword selection and search engine optimization (SEO) page creation; and prioritizing sales leads.

Figure 5:
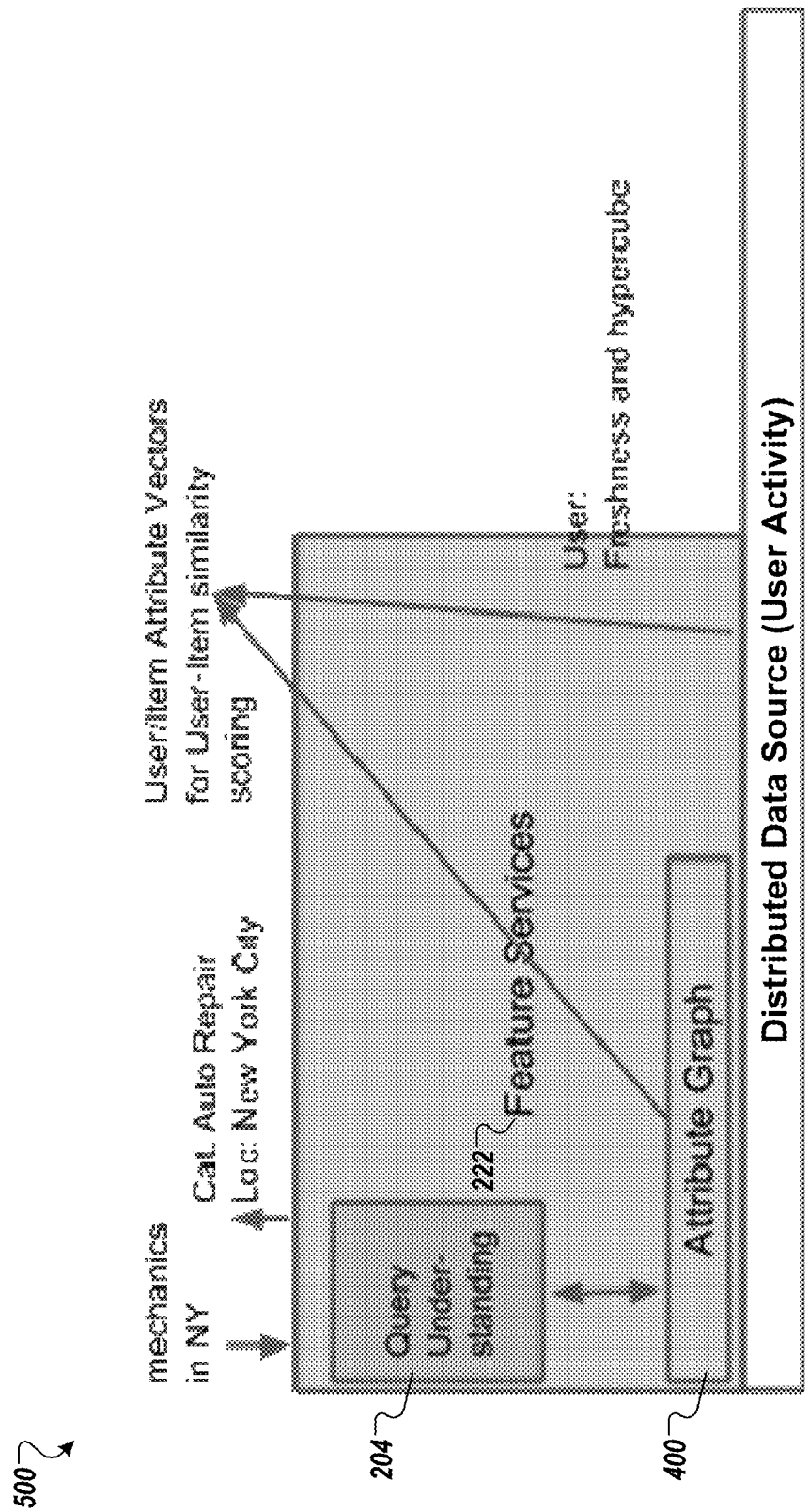
FIG. 5 illustrates an exemplary process for generating, by a feature service, user-item attribute vectors for user-item similarity scoring within embodiments of a universal relevance services framework in accordance with some embodiments discussed herein.

FIG. 5 illustrates an exemplary process 500 for generating, by a feature service (e.g., feature service 222 as referenced in FIG. 2), user-item attribute vectors for user-item similarity scoring within embodiments of a universal relevance services framework (e.g., system 100 as referenced in FIGS. 1-3). Process 500 is illustrated for clarity and not for limitation of the invention.

In embodiments, for a given user's profile, a scoring function is run to produce a user-deal relevance score. The user-deal relevance score is often based on a conversion rate estimate (i.e., the probability that the user is going to make a purchase, adjusted by deal price and margin). Thus, the scoring function calculates the user-deal relevance score based on expected revenue. In some embodiments of a universal relevance services framework (e.g., system 100 with reference to FIG. 1), the scoring function is executed in the distributed search cluster 120 (for example in scoring plugin 300 with reference to FIG. 3).

Figure 6:
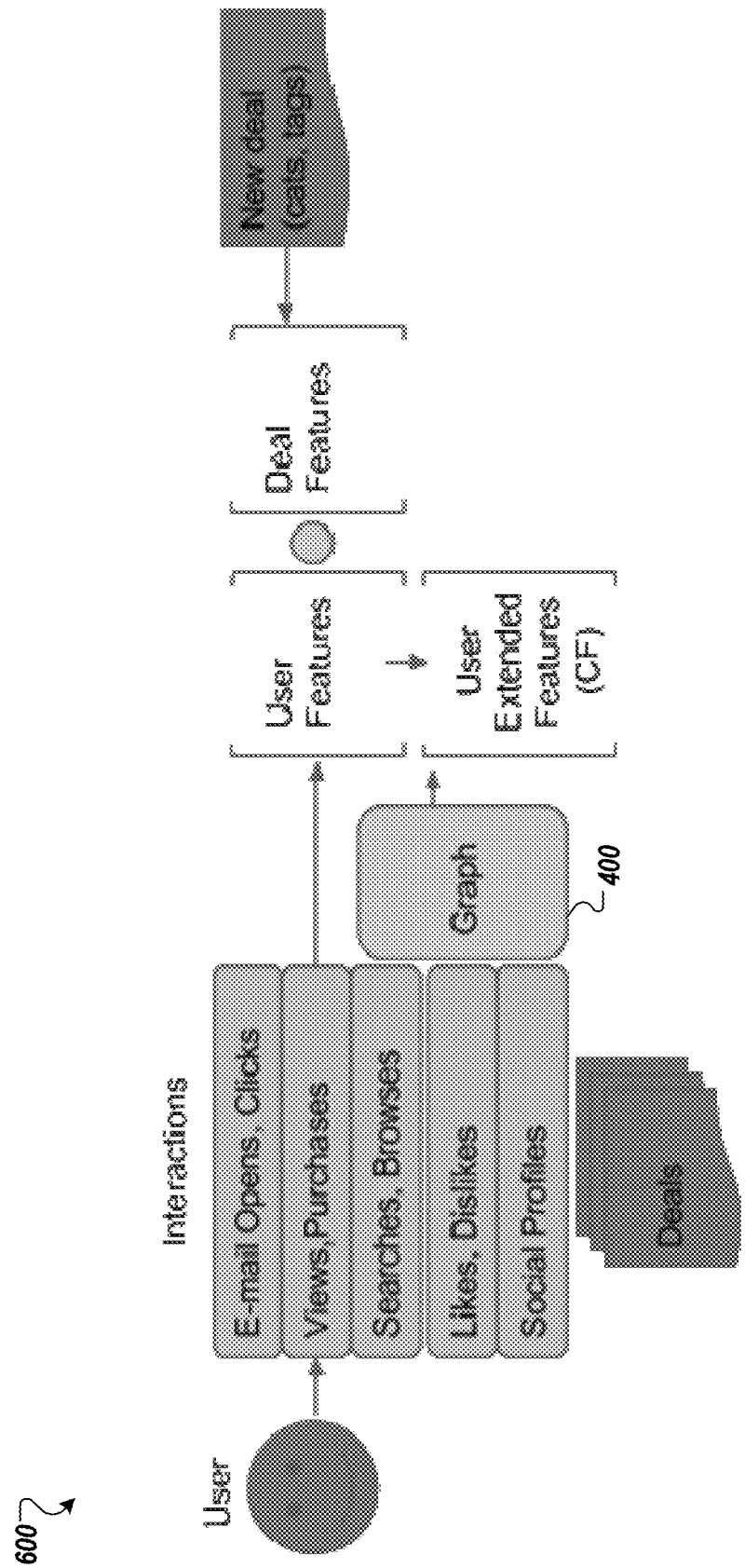
FIG. 6 illustrates an exemplary process for combining an attribute graph with historical interactions to generate user-item vectors in accordance with some embodiments discussed herein.

FIG. 6 illustrates an exemplary process 600 for combining an attribute graph 400 with historical interactions to generate user-item vectors, which will then be used to compute a user-item relevance score. Ranking of items for a user in terms of their relevance can be based in part on their respective user-item relevance scores. Process 600 is illustrated for clarity and not for limitation of the invention.

In embodiments, the user-deal relevance score is based on the following features: Odds (past performance data (historical conversion) computed from jointed user and deal attributes); DDO (past deal performance, based on mapping an individual deal's performance data to all users similar to the given user); Similarity (a computation of the likelihood that the given user's preference is similar to the given deal); Freshness (a possible penalty based on whether this particular deal has been exposed previously to the particular user); and Purchase Backoff (similar to freshness, but instead a possible penalty if the given user has purchased the particular deal recently).

In some embodiments, user-deal interaction data are stored as a set of join tables: UxD, UxDA, UAxD, and UAxDA, where U=User, D=Deal, and A=Attribute. The data stored in these tables can include events (e.g., sends, impressions, views, clicks, and purchases) and counts (e.g., raw counts (counts over different time windows) and decayed counts (counts with different decay rates). In embodiments, feature vectors can be constructed by transforming the tables to matrices and then using matrix algebra to construct the vectors.

Figure 7:
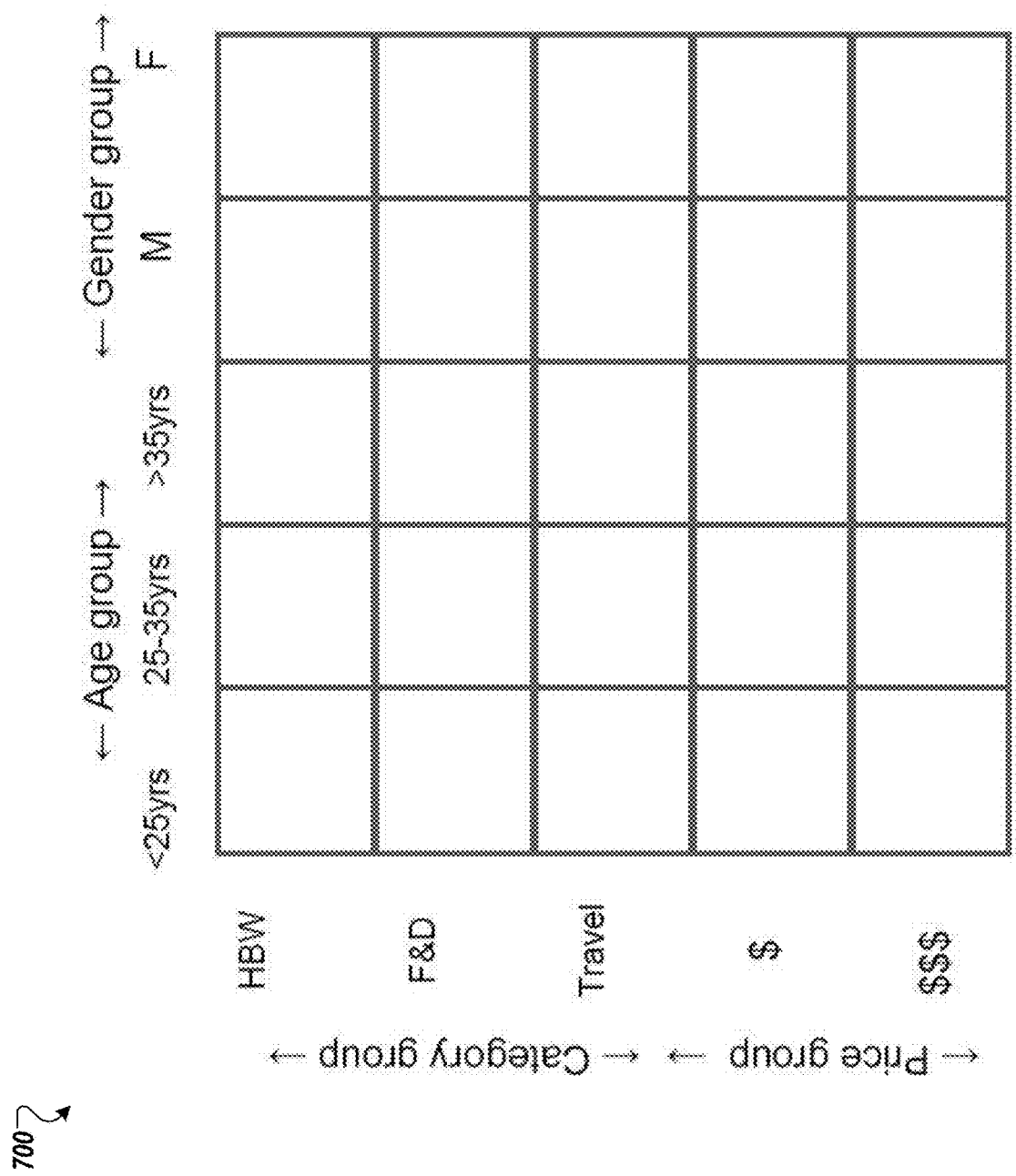
FIG. 7 is an illustration of an exemplary UA×DA table for storing click counts in accordance with some embodiments discussed herein.

FIG. 7 is an illustration of an exemplary UAxDA table 700 for storing click counts. The columns represent user attributes (age, group, and gender), and the rows represent deal attributes (category and price group). The table cells can be transformed to scores, and then the table can be transformed into a matrix (da_i's are row vectors and ua_js are column vectors).

FIGS. 8-11 illustrate an exemplary calculation of a user-deal similarity score based on user-deal interaction data. The example, in which a particular deal is scored against a particular user, is illustrated for clarity and not for limitation of the invention. In some embodiments, each deal identified in a search may be scored against the user to obtain a ranking based on similarity.

Figure 8:
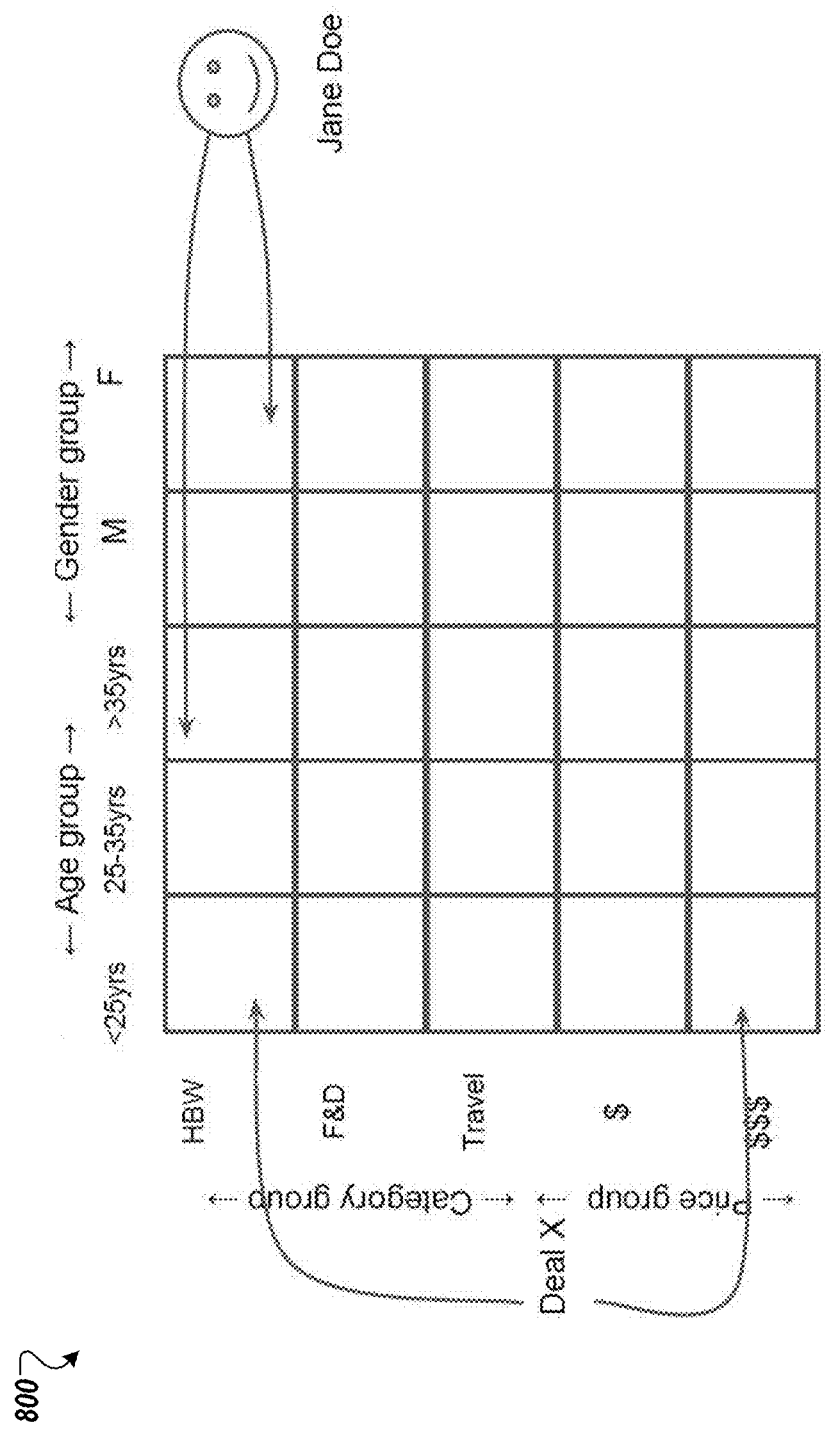
FIG. 8 illustrates an exemplary UA×DA table for an exemplary user and an exemplary deal in accordance with some embodiments discussed herein.

FIG. 8 illustrates an exemplary UAxDA table 800 for an exemplary user (Jane Doe), who is a female at least 35 years old and an exemplary deal X in the HBW (Health, Beauty, & Wellness) category and the $$$ price group. In embodiments, Jane Doe's attributes can be projected to deal space by Creating a Boolean vector <map_user(u)> for mapping Jane Doe's attribute values to the UA table (1's indicate Jane Doe's attributes)

Normalizing over each attribute group, since counts distribute over each attribute group Taking a weighted average of each column vector In embodiments, some features may be determined to be more important than other features because they tend to separate the classes better. Referring to the exemplary UAxDA table 800, gender (F for Jane Doe) may be determined to be more important than age (>35 for Jane Doe) because the value F may separate the product categories into {0.8, 0.1, 0.1} while the value >35 may separate the categories into {0.4, 0.3, 0.3}.

In some embodiments, important features may be weighted using a weighting heuristic, e.g., gain ratio. Those with skill in the art will recognize that a variety of weighting heuristics are available, and the choice of weighting heuristic is apparent to others with ordinary skill in the art.

Figure 9:
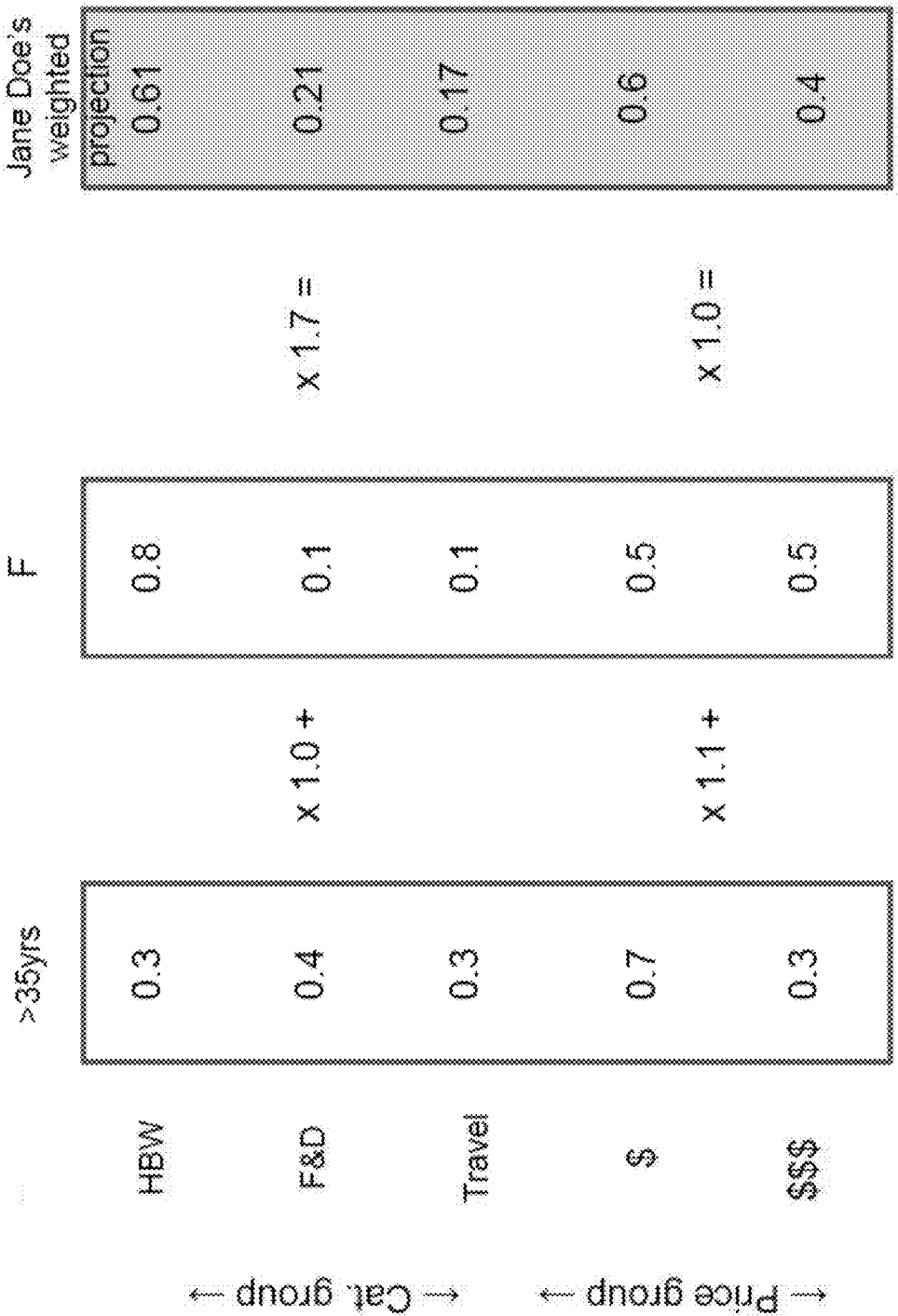
FIG. 9 illustrates an exemplary projection of user attributes to deal space in accordance with some embodiments discussed herein.
Figure 10:
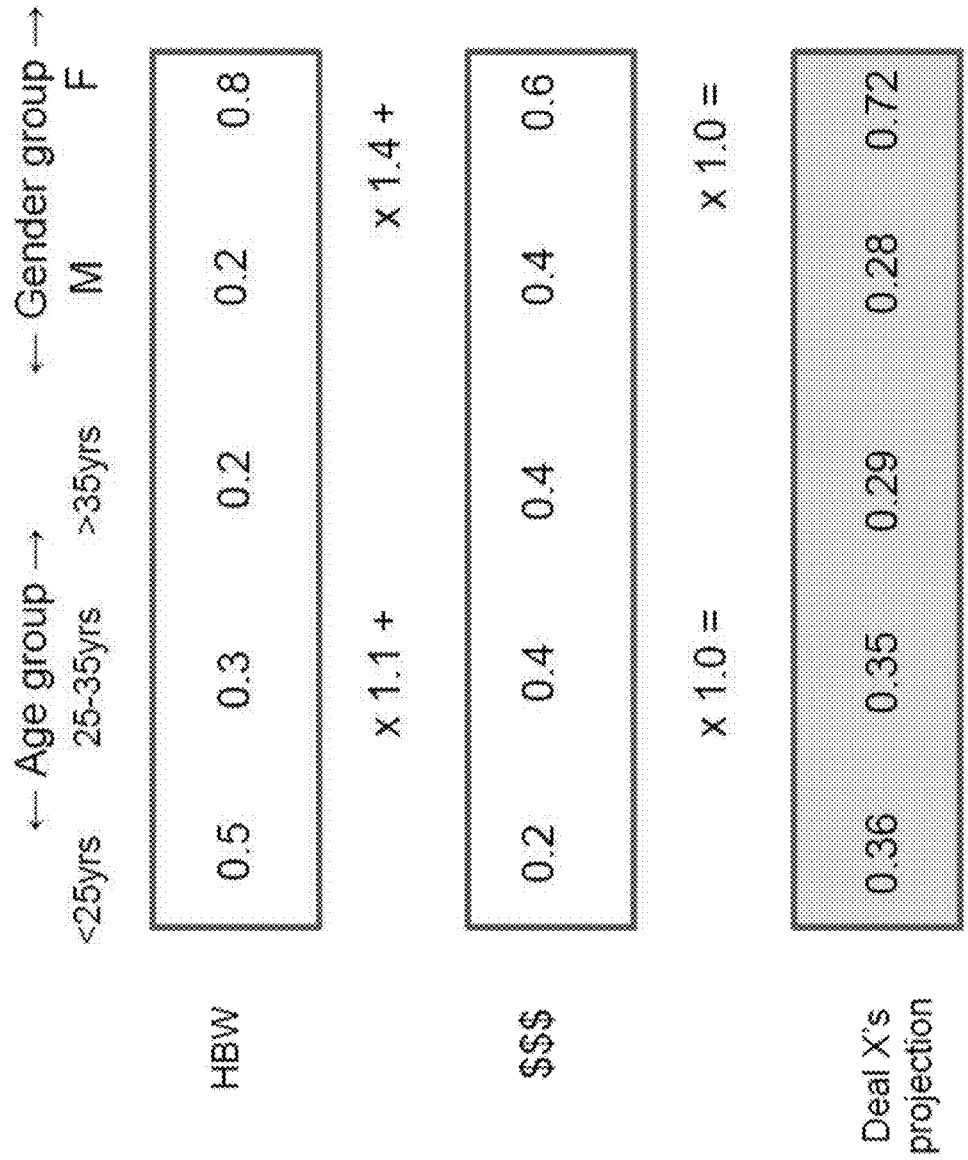
FIG. 10 illustrates an exemplary projection of deal attributes to user space in accordance with some embodiments discussed herein.

FIG. 9 illustrates an exemplary projection 900 of user attributes to deal space. Note that the projection <project_user(u)> is a real-valued column vector projection FIG. 10 illustrates an exemplary projection 1000 of deal attributes to user space. The calculation, based on a direct vector mapping of Deal X <map_deal(d)>, is the same as described with reference to FIG. 8. Note that the projection <project_deal(d)> is a real-valued row vector projection.

Figure 11:
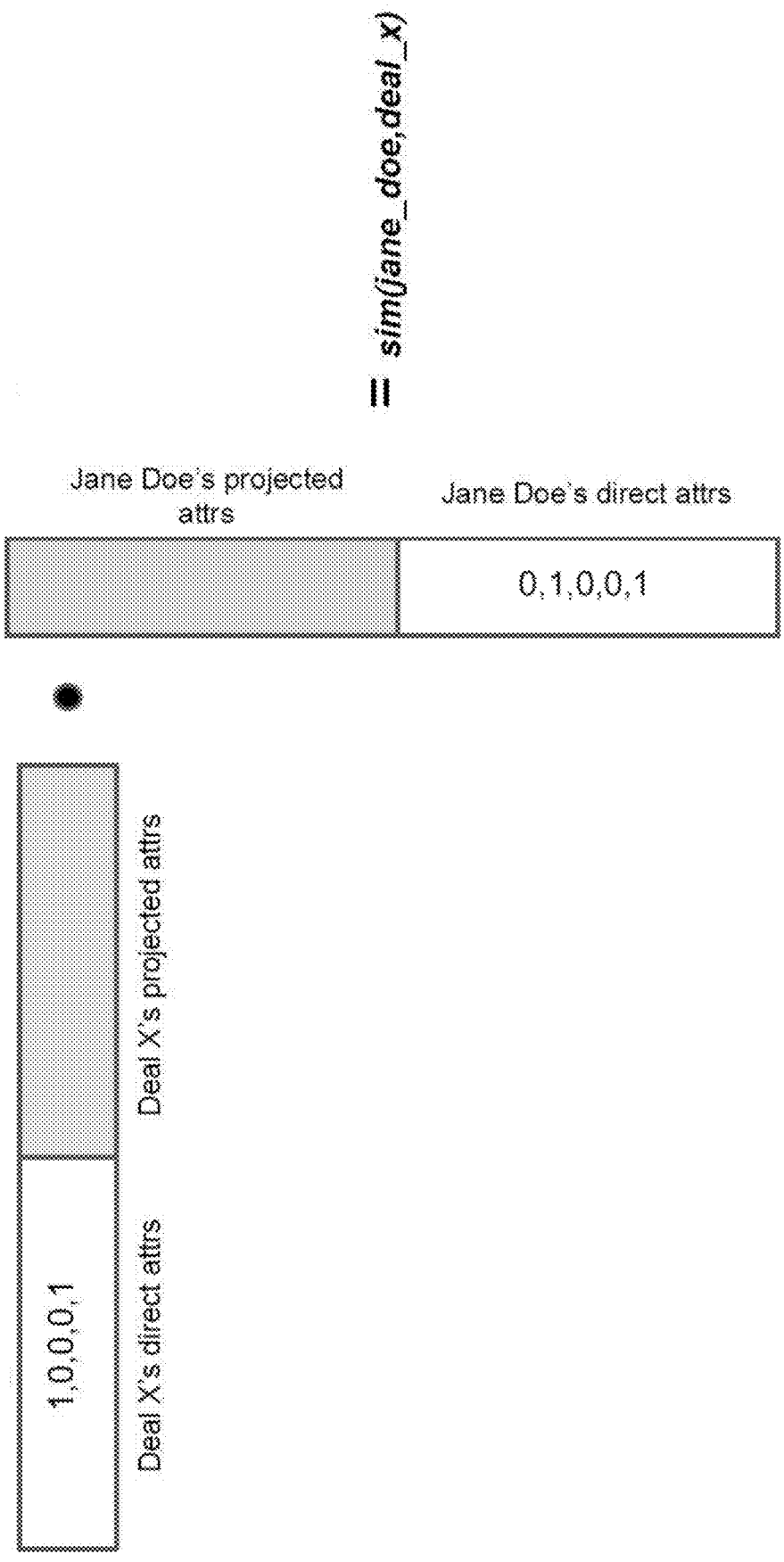
FIG. 11 illustrates an exemplary calculation of user-deal similarity in accordance with some embodiments discussed herein.

FIG. 11 illustrates an exemplary calculation 1100 of user-deal similarity for exemplary user Jane Doe and exemplary deal X. In embodiments, extended vectors, which are now vectors in the same extended <user,deal> space, are calculated for the user ev_user(u) and deal ev_deal(d) based on their respective direct vectors and projected vectors according to the equations:

$$\text{ev\_user}(u) = <\text{project\_user}(u), \text{map\_user}(u)> \quad \text{Equation 1}$$

$$\text{ev\_deal}(d) = <\text{map\_deal}(d), \text{project\_deal}(d)> \quad \text{Equation 2}$$

In some embodiments, the similarity calculation sim(u,d) is the dot product or cosine similarity, according to the equation:

$$\text{sim}(u,d) = \text{ev\_user}(u) \backslash \text{dot ev\_deal}(d) \quad \text{Equation 3}$$

In some embodiments, DDO and Odds are incorporated into Similarity for calculation of the user-deal relevance score. For example, in embodiments, DDO and Odds may be calculated using the join tables as follows:

Use the UxDA matrix to obtain the user's projection to the deal space (call this the user-deal space evidence)

Blend this with the user→deal projection computed from UA×DA (call this the user-deal prior projection)

Use the UA×D matrix to obtain the deal's projection to the user space (call this the deal-user space evidence)

Blend this with the deal→user projection computed from UA×DA (call this the deal-user prior projection)

Compute similarity using dot product or cosine over blended vectors

Figure 12:
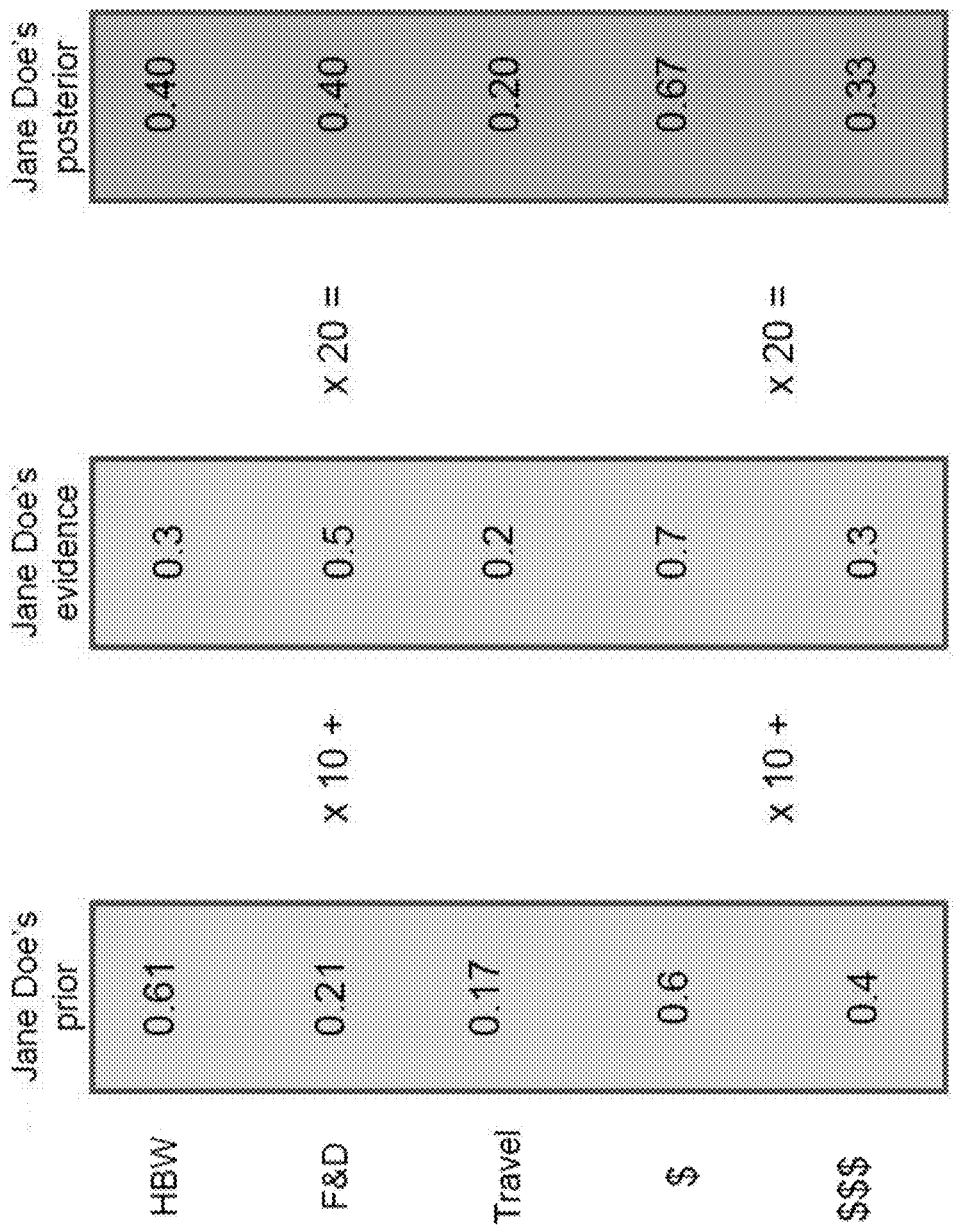
FIG. 12 illustrates an exemplary Bayesian blending of Odds and DDO in user-deal space in accordance with some embodiments discussed herein.

FIG. 12 illustrates an exemplary Bayesian blending 1200 of Odds and DDO in user-deal space. The example refers to the exemplary data described previously with reference to UA×DA table 800 illustrated in FIG. 8.

For clarity, the term "clicks" as used in the following descriptions may refer, without limitation, to "all positive events transformed to equivalent clicks" and/or "decayed and transformed equivalent clicks."

In some embodiments, Bayesian blending may be calculated as follows:

Assume n events generated by prior (n could be avg. no. of events per user in a week)

Observe m actual events for user (or deal) (over a month or a week; decayed counts can also be used)

Take weighted avg. to get posterior: (n×prior+m× evidence)/(n+m)

Converges towards observed with more evidence (m>>n)

In embodiments, Odds and DDO both are purchase rate estimates that are generated from historical data (e.g., clicks). In some embodiments, clicks may be transformed to equivalent "purchases" by finding an average clicks to purchases ratio from historical data. Alternatively, in some embodiments, a non-linear transform may be used:

Equivalent purchases=clicks/(0.5*clicks/purchases+ 0.5*average_click_to_purchase_rate)

Where clicks and purchases are #of historical clicks and purchases for a given deal, and average_click_to_purchase_rate is the average rate using all deals In some cases, there is insufficient data in the user and/or deal space to enable DDO and/or Odds calculation. In the case of Odds, in some embodiments, the data may need to be rolled up to a higher level of organization. For example, assume that the prior distribution for a female user and FD (Food and Drink) deals within a particular distance and price is <distance<=4 miles, Food&Drink, Female, 200-400$>

After rolling up, the prior distribution data may be found in

<distance<=4 miles, Food&Drink, Female>

There may be a variety of ways to roll up data. For example, an alternative rollup may be <distance<=4 miles, Food&Drink, 200-400$>

In some embodiments, there is a rolling up order that is to follow the structure of an Odds tree. In this example, the Odds tree structure is:

distance→deal's categories→user gender→deal price

In some embodiments, an Odds tree structure may be determined using machine learning (a decision tree approach). Instead of using the output of the decision tree, historical data are used to populate each tree node.

In some embodiments, there are various strategies to create statistics on a "parent" level when rolling up. One approach is to use statistics (impressions, views, purchases) at the parent level. To save resources, only enough data to support the statistics are burrowed from the parent level. For example, assume that there are 15000 impressions in <distance, category, gender, price> and our sufficiency is 20000 impressions. Thus, only 5000 impressions (and equivalent number of purchases) will be burrowed from the parent level. If the price bucket is high, this can prevent bias in the statistics because of lower price buckets In the case of determining DDO, there may not be enough data in the attribute of a particular one of the users to decide whether or not to use that attribute in the calculations. In some embodiments, a statistical test is performed on each user attribute to decide whether an attribute should be used or ignored in the calculations. For example, in embodiments, a Two-One-Sided-Test (TOST) is used to test equivalence. For example, assume that a conversion rate estimate is to be calculated for a given FD deal of user attributes (16<=distance<=32, female, age=25). The calculation begins by computing the likelihood from the attributes that are most significantly different from the others (e.g., statistics from 16<=distance<=32 are compared to statistics from all other distance buckets: distance<16 or distance>32). The TOST test produces a p-value for the null hypothesis that statistics in the treatment are close to the control. Based on the TOST test, only attributes that produce statistics that reject the null hypothesis are selected. Additionally, the initial estimate is taken only from the attributes that reject the null hypothesis with highest confidence.

Figure 13:
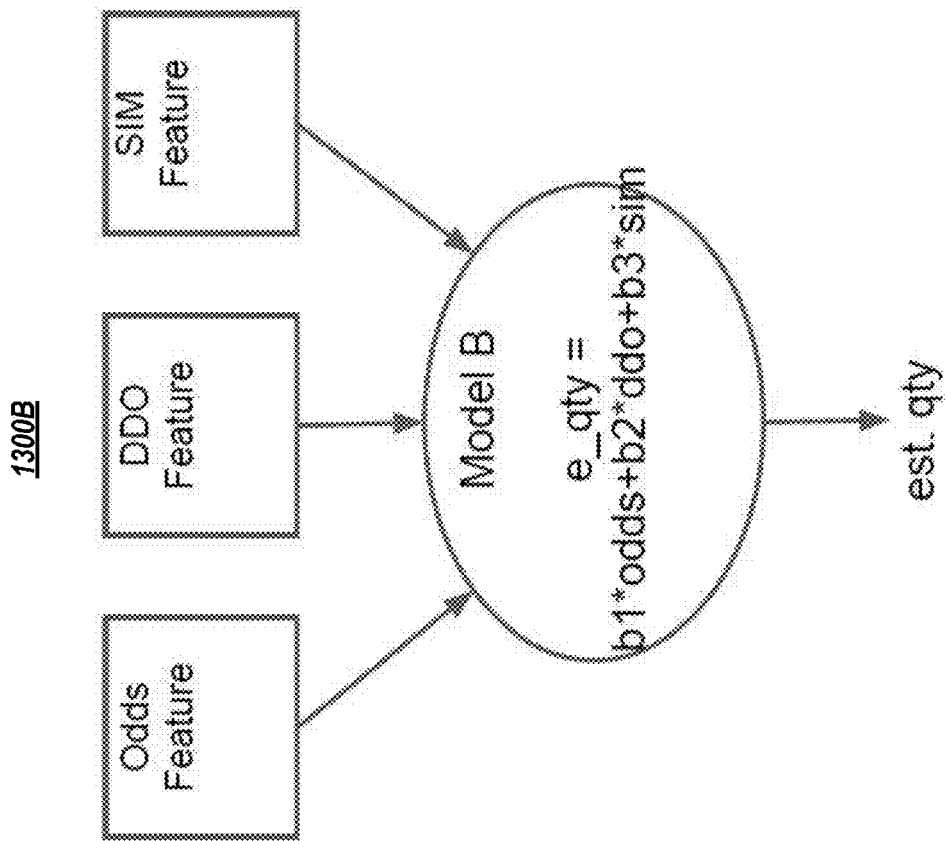
FIG. 13 illustrates two exemplary linear scoring models that use Odds, DDO, and Similarity features in accordance with some embodiments discussed herein.
Figure 13:
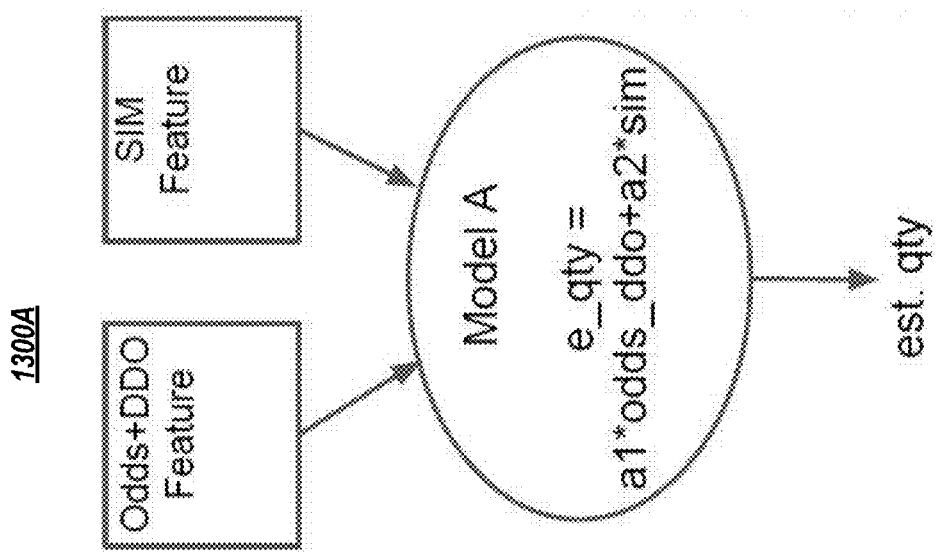

FIG. 13 illustrates two exemplary linear scoring models that use Odds, DDO, and Similarity features. These models are illustrated for clarity and not for limitation of the invention. Model 1300A is based on combining a Similarity feature with a blended Odds and DDO feature, while Model 1300B is based on combining a Similarity feature with separate Odds and DDO features.

In some embodiments, a combined score for Odds and DDO is calculated using a Gaussian Conjugate Prior approach (see http://en.wikipedia.org/wiki/Conjugate_prior) in which Odds is used as the prior and DDO is used as the likelihood.

Figure 14:
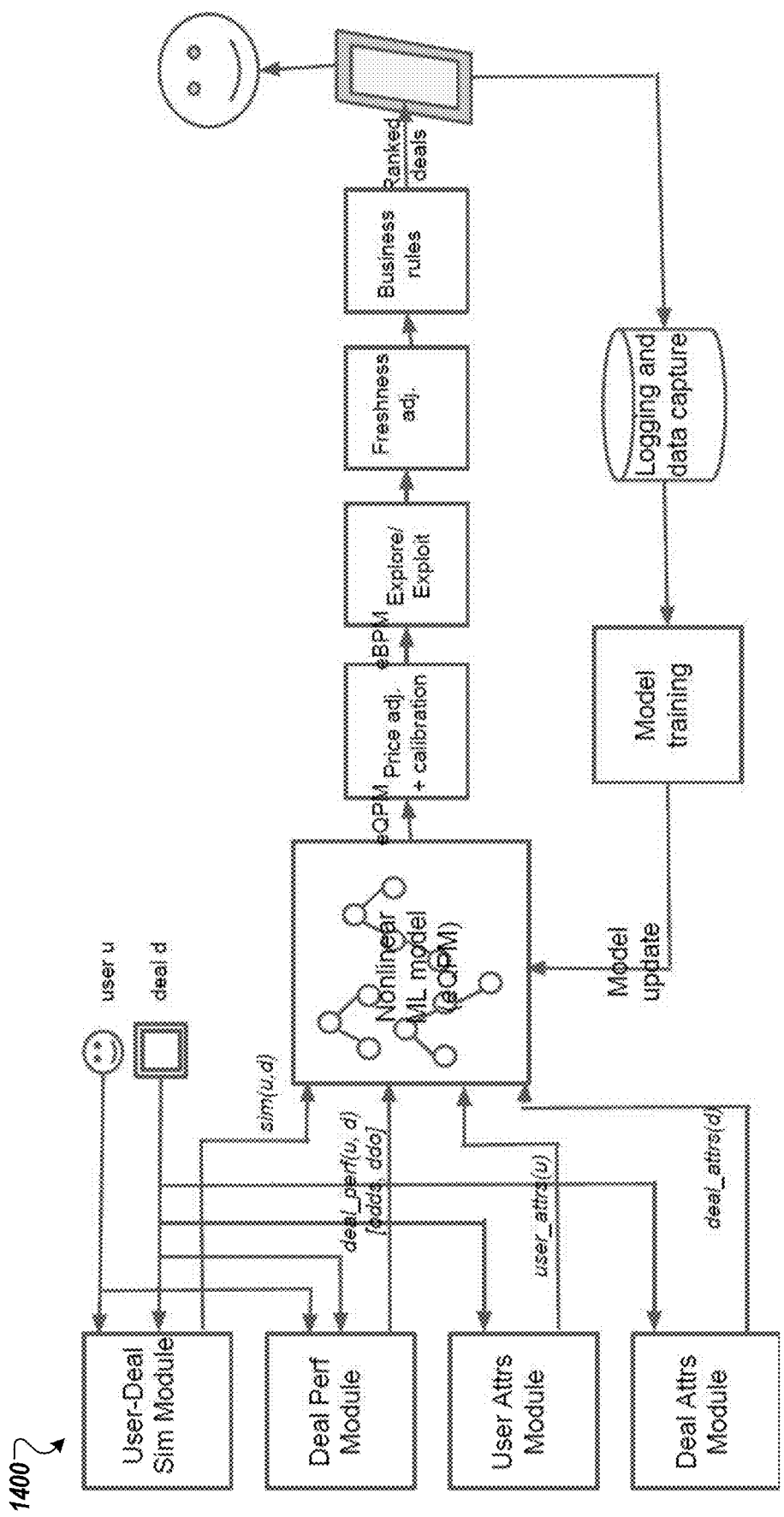
FIG. 14 illustrates an exemplary process for calculating user-deal relevance scores using similarity calculations and machine learning models in accordance with some embodiments discussed herein.

FIG. 14 illustrates an exemplary process 1400 for calculating user-deal relevance scores using similarity calculations and machine learning models. Process 1400 is illustrated for clarity and not for limitation of the invention. In various embodiments, user-relevance scoring can be based on machine learning models (e.g., supervised learning models that are derived using training data) that are used alone or in combination with various linear models, as previously described.

Figure 15:
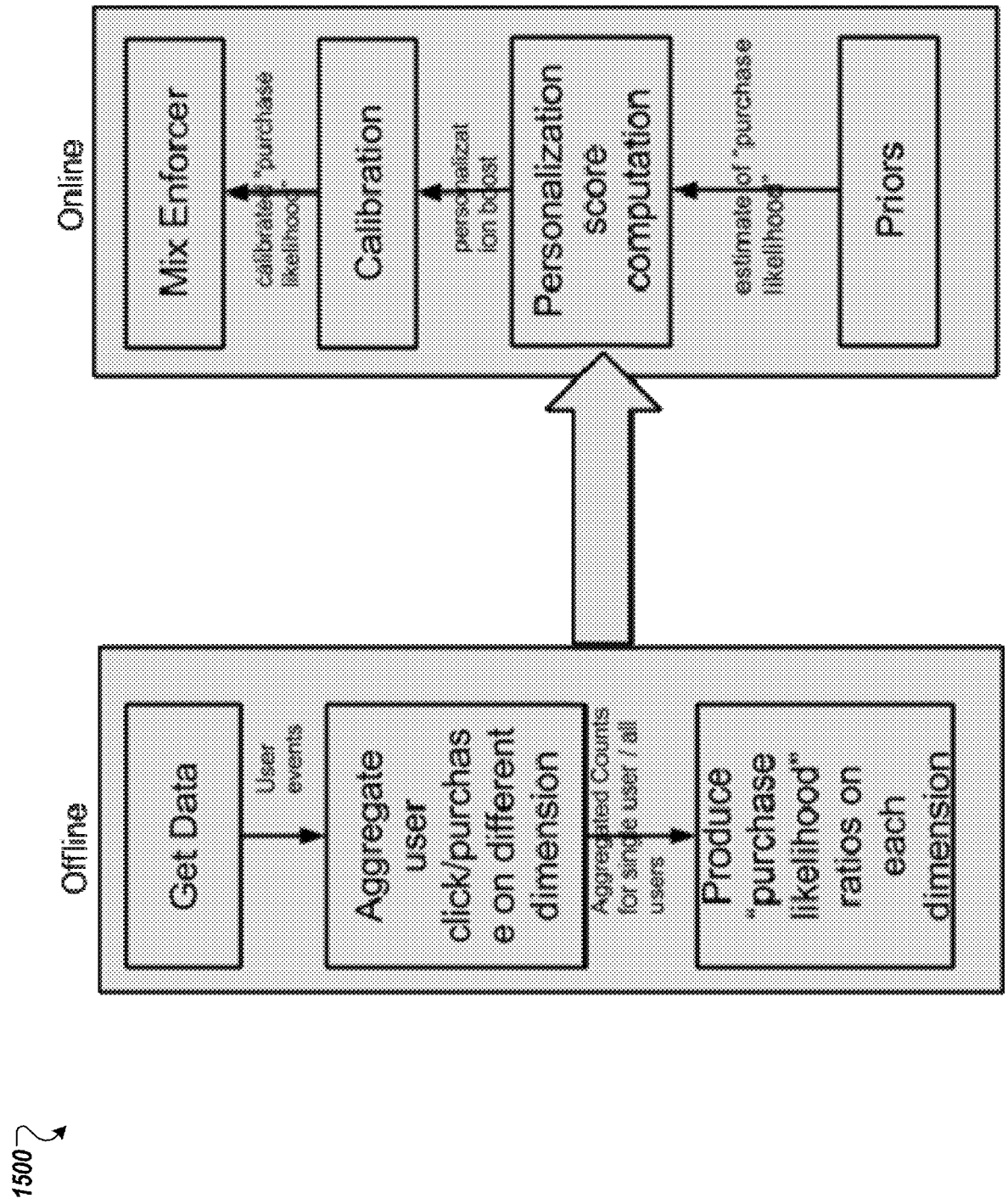
FIG. 15 illustrates an exemplary process for adjusting the user-relevance scores respectively associated with a set of ranked deals in accordance with some embodiments discussed herein.

FIG. 15 illustrates an exemplary process 1500 for adjusting the user-relevance scores respectively associated with a set of ranked deals. Process 1500 is illustrated for clarity and not for limitation of the invention. In various embodiments, process 1500 may be implemented in addition to user-relevance scoring (e.g., implemented in scoring plugin 330 referenced in FIG. 3), and additionally and/or alternatively in one or a combination of a separate co-ranking process in distributed search node 120 and aggregator node 110, both referenced in FIGS. 1-3. The implementation choice of process 1500 is not critical to the invention.

In embodiments, adjusting a deal's associated user-relevance score based on personalization includes considering a user's clicks and purchases, equating clicks to purchase, computing a click likelihood for the deal's category/subcategory/subcategory2 and price band, and comparing this click likelihood to the average likelihood. This comparison yields a ratio; if it exceeds 1, it can be interpreted as the user having an increased likelihood of buying the deal relative to the average user, while if it is less than 1, it can be interpreted as having a decreased likelihood of buying the deal relative to the average user.

In embodiments, deal clicks and purchases are aggregated over multiple dimensions that can include, for example, one or a combination of top level category, sub level category, sub level 2 category, and (binned) price. As each dimension provides an independent vote via its likelihood ratio, the question arises on how to combine these votes. Two extremes are to take products, or to average using geometric mean. In some embodiments, it has been found that averaging using the straight geometric mean guards against the product values from becoming very large or very small.

Once the compounded ratio has been computed, it is used as a multiplicative adjustment to the deal's user-relevance score computed by a base model (e.g., a model based on Similarity, Odds and DDO as previously described with reference to FIGS. 13-14). There is a Naive Bayes assumption underlying this adjustment: the base model produces a base likelihood of purchase using generic user and deal attributes, but not the user's own activity, while personalization considers the user's own activity in terms of clicks and purchases and views them as independent signals that serve to either increase or decrease the base likelihood given this particular user's preferences as expressed through their interactions with deals.

In some embodiments, the multiplicative adjustment is only made if the ratio is greater than 1. Penalization of deals (i.e. demoting of a deal's rank with respect to other deals' rankings) which the user has been ignoring may be handled through a "freshness" model which computes a penalty for deals that the user has consistently been ignoring, as previously described with reference to FIG. 6.

In some embodiments, there may be tuning knobs in the form of a cap on the max value of the computed adjustment, and on the minimum number of clicks needed for the adjustment to be computed at all.

Referring to process 1500, in embodiments, ratios are computed via an offline job for each user, which looks back a certain period and aggregates activity for that period. Time decays are used to "decay" counts which occurred further in the past (e.g., a half-life of 4 months). In some embodiments, the decay rate can be configurable). In some embodiments, a positional correction is used by deflating the impression counts in non-P1 (position 1) positions, based on using a positional effects table.

Following is an example, presented for clarity and without limitation, of data flow through personalization described by process 1500.

Assume that data describing user A includes X1 clicks, X2 purchases, and X3 impressions in "restaurant" category deals, Y1 clicks; Y2 purchases, and Y3 impressions in "Mexican restaurant" subcategory deals; and Z1 clicks, Z2 purchases, and Z3 impressions in price 80-100 deals. Assume that data describing all users includes A1 clicks, A2 purchases, and A3 impressions in "restaurant" category deals; B1 clicks, B2 purchases, and B3 impressions in "Mexican restaurant" subcategory deals; and C1 clicks, C2 purchases, and C3 impressions in price 80-100 deals.

Assuming a purchaseToClick value R, the estimated click through rate of user A on the "restaurant" category is expressed as (X1+X2*R)/X3 and the estimated click through rate of all users' behavior on the "restaurant" category is (A1+A2*R)/A3. The ratio comparing user A's behavior with all users' behavior is (X1+X2*R)/X3 divided by (A1+A2*R)/A3.

After using the same computation for "Mexican restaurant" subcategory and price "80-100" buckets, there now are 3 ratios, each for a different dimension.

A particular deal is associated with one or a combination of buckets (e.g., the deal's category, subcategory, subcategory2, and price). For each of the deal's associated bucket (e.g., a Mexican restaurant falls into "restaurant," "Mexican restaurant," and a price bucket), we multiply the buckets' respectively associated ratios together and take a geometric mean. This result is the deal's personalization score (e.g., a user-relevance score boost, as it applies to some priors computed by other component).

In the above example, if a deal is Mexican restaurant and its price is 95 (which falls in 80-100 range), the personalization score for this user is the 3rd root of ((X1+X2*R)/X3)/((A1+A2*R)/A3)*(Y1+Y2*R)/Y3)/((B1+B2*R)/B3)*(Z1+Z2*R)/Z3)/((C1+C2*R)/C3)).

In some embodiments, an implementation of process 1500 includes a set of tools which can be used to examine mix shifts along various dimensions (category, subcategory, subcategory 2, price etc) with and without personalization being enabled. The tools can also be used to plot the distributions of the personalization adjustment scores. Thus, these tools may be used to examine the output of personalization and cross-check against assumptions that the scores and mix shifts match expectations.

Turning to FIG. 15, the mix enforcer in process 1500 may be viewed as an "anti-personalization" component. The goal of this component is to keep the deal mix (along different dimensions such as channel, category, and price) to within pre-specified ranges. In some embodiments, this component was introduced after observing that the natural ranking tended to skew heavily towards one or other type of deal (again measured along different dimensions), which was not easily overcome by tweaking the tuning knobs available (which tended to shift things abruptly rather than gradually). Mix enforcement runs contrary to personalization in a sense, and, in some embodiments, process 1500 includes mix enforcement relaxation (i.e., allow a range for the constraint rather than using a single numeric constraint). Mix enforcement will be described in detail with reference to FIGS. 16 and 17.

Figure 16:
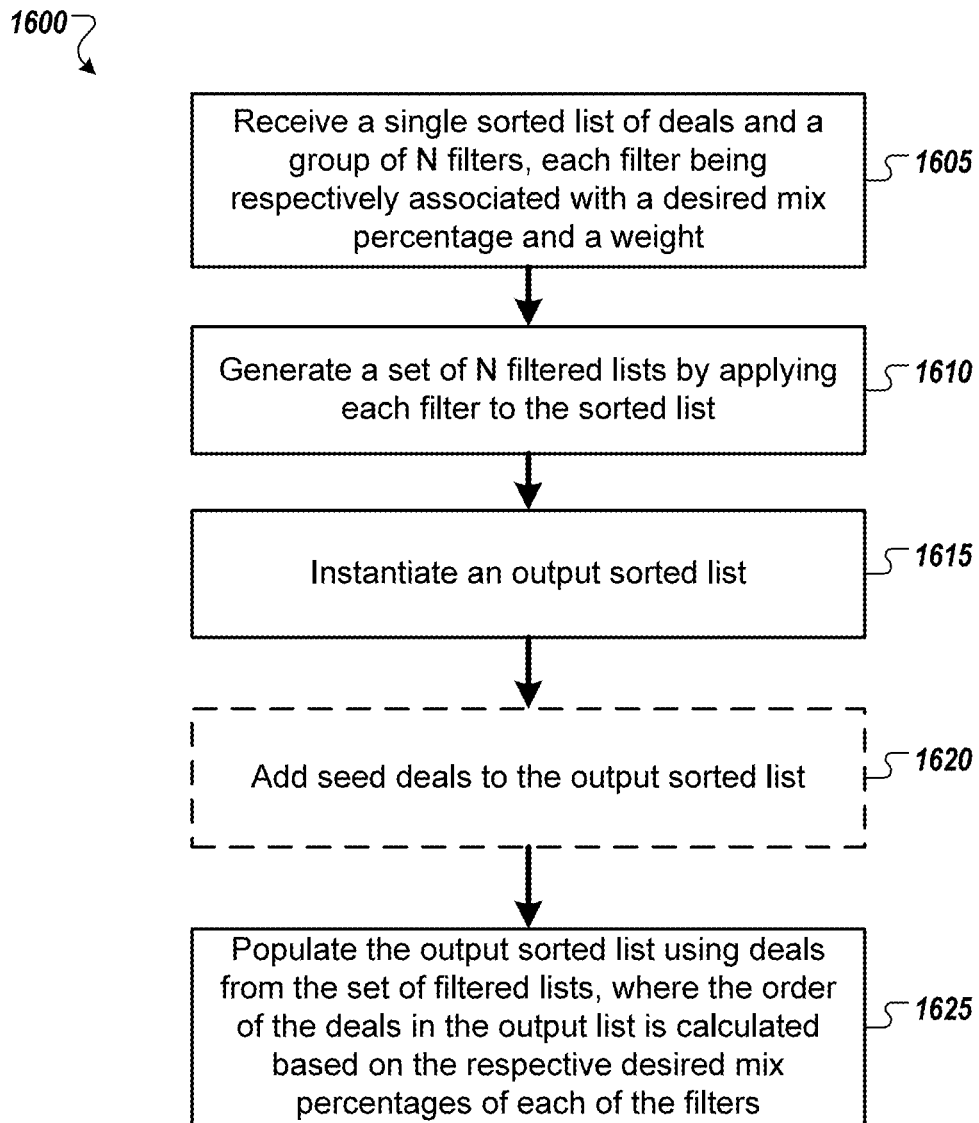
FIG. 16 is a flow diagram of an example method for maintaining a diversity mix in a set of deals that have been ranked based on their respective user-relevance scores in accordance with some embodiments discussed herein.

FIG. 16 is a flow diagram of an example method 1600 for maintaining a diversity mix in a set of deals that have been ranked based on their respective user-relevance scores. For convenience, the method 1600 will be described with respect to a system that includes one or more computing devices and performs the method 1600. Specifically, the method 1600 will be described with respect to mix enforcement processing of the top N results 345 generated by distributed search node 125 and referenced in FIGS. 3 and 15. In various embodiments, method 1600 may be implemented in addition to user-relevance scoring (e.g., implemented in Scoring Plugin 330 referenced in FIG. 3), and additionally and/or alternatively in one or a combination of a separate co-ranking process in distributed search node 120 and aggregator node 110, both referenced in FIGS. 1-3. The implementation choice of method 1600 is not critical to the invention.

In embodiments, the system implements a greedy algorithm that iterates through an input list of items (e.g., a list of ranked deals) and, at each iteration, chooses the item which least violates a full set of configured constraints.

In embodiments, the system receives 1605 a single sorted list of deals and a group of N filters, each filter representing a constraint and being respectively associated with a desired mix percentage, and a weight. In some embodiments, exemplary filters may include ChannelTypeFilter, DealCategoryFilter, and AgeFilter.

In embodiments, the system generates 1610 a set of N filtered lists by applying each filter to the sorted list.

In embodiments, after instantiating 1615 an empty output sorted list, the system optionally adds 1620 any seed deals associated with the filters to the output sorted list. In embodiments, a filter may be associated with at least one seed deal. If a filter is associated with any seed deals, those deals are added to the top of the output sorted list and the mix enforcement process is skipped for that filter.

In embodiments, the system populates 1625 the output sorted list using deals from the set of filtered lists. The mix percentage of the output sorted list is calculated based on the deals' attributes, and the order of those deals in the output sorted list is based on the desired mix percentages.

FIG. 17 is a flow diagram of an example method 1700 for selecting items to add to an output sorted list to optimize the mix percentage of the output sorted list. For convenience, the method 1700 will be described with respect to a system that includes one or more computing devices and performs the method 1600. Specifically, the method 1700 will be described with respect to the implementation of step 1625 in method 1600.

In embodiments, the system receives 1705 N filtered lists of deals, an input deal list, and a desired mix percentage for the output deal list. Each of the N filtered lists of deals is associated with a list head pointer.

In embodiments, the system generates 1710 an input list of N deals by selecting the deal at the head pointer of each filtered list. For each deal in the input list, the system calculates 1715 the future mix percentage of the output list if the deal were to be added to the output list.

In embodiments, the system identifies 1720 an input deal associated with a future mix percentage that is closest in value to the desired mix percentage. In embodiments, the system chooses 1725 the identified input deal by adding the deal to the output list and removing that deal from each of the filtered lists.

In embodiments, the system advances 1735 the head pointer in each of the filtered lists and then repeats steps 1710, 1715, 1720, and 1725 until the system determines 1730 that no deals are remaining in the filtered lists. The system returns 1740 the output deal list in an instance in which no deals remain in the filtered lists.

FIG. 18 shows a schematic block diagram of circuitry 1800, some or all of which may be included in, for example, universal relevance service framework 100. As illustrated in FIG. 18, in accordance with some example embodiments, circuitry 1800 can include various means, such as processor 1802, memory 1804, communications module 1806, and/or input/output module 1808. As referred to herein, "module" includes hardware, software and/or firmware configured to perform one or more particular functions. In this regard, the means of circuitry 1800 as described herein may be embodied as, for example, circuitry, hardware elements (e.g., a suitably programmed processor, combinational logic circuit, and/or the like), a computer program product comprising computer-readable program instructions stored on a non-transitory computer-readable medium (e.g., memory 1804) that is executable by a suitably configured processing device (e.g., processor 1802), or some combination thereof.

Processor 1802 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 18 as a single processor, in some embodiments processor 1802 comprises a plurality of processors. The plurality of processors may be embodied on a single computing device or may be distributed across a plurality of computing devices collectively configured to function as circuitry 1800. The plurality of processors may be in operative communication with each other and may be collectively configured to perform one or more functionalities of circuitry 1800 as described herein. In an example embodiment, processor 1802 is configured to execute instructions stored in memory 1804 or otherwise accessible to processor 1802. These instructions, when executed by processor 1802, may cause circuitry 1800 to perform one or more of the functionalities of circuitry 1800 as described herein.

Whether configured by hardware, firmware/software methods, or by a combination thereof, processor 1802 may comprise an entity capable of performing operations according to embodiments of the present invention while configured accordingly. Thus, for example, when processor 1802 is embodied as an ASIC, FPGA or the like, processor 1802 may comprise specifically configured hardware for conducting one or more operations described herein. Alternatively, as another example, when processor 1802 is embodied as an executor of instructions, such as may be stored in memory 1804, the instructions may specifically configure processor 1802 to perform one or more algorithms and operations described herein, such as those discussed in connection with FIGS. 1-3.

Memory 1804 may comprise, for example, volatile memory, non-volatile memory, or some combination thereof. Although illustrated in FIG. 18 as a single memory, memory 1804 may comprise a plurality of memory components. The plurality of memory components may be embodied on a single computing device or distributed across a plurality of computing devices. In various embodiments, memory 1804 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. Memory 1804 may be configured to store information, data (including analytics data), applications, instructions, or the like for enabling circuitry 1800 to carry out various functions in accordance with example embodiments of the present invention. For example, in at least some embodiments, memory 1804 is configured to buffer input data for processing by processor 1802. Additionally or alternatively, in at least some embodiments, memory 1804 is configured to store program instructions for execution by processor 1802. Memory 1804 may store information in the form of static and/or dynamic information. This stored information may be stored and/or used by circuitry 1800 during the course of performing its functionalities.

Communications module 1806 may be embodied as any device or means embodied in circuitry, hardware, a computer program product comprising computer readable program instructions stored on a computer readable medium (e.g., memory 1804) and executed by a processing device (e.g., processor 1802), or a combination thereof that is configured to receive and/or transmit data from/to another device, such as, for example, a second circuitry 1800 and/or the like. In some embodiments, communications module 1806 (like other components discussed herein) can be at least partially embodied as or otherwise controlled by processor 1802. In this regard, communications module 1806 may be in communication with processor 1802, such as via a bus. Communications module 1806 may include, for example, an antenna, a transmitter, a receiver, a transceiver, network interface card and/or supporting hardware and/or firmware/software for enabling communications with another computing device. Communications module 1806 may be configured to receive and/or transmit any data that may be stored by memory 1804 using any protocol that may be used for communications between computing devices. Communications module 1806 may additionally or alternatively be in communication with the memory 1804, input/output module 1808 and/or any other component of circuitry 1800, such as via a bus.

Input/output module 1808 may be in communication with processor 1802 to receive an indication of a user input and/or to provide an audible, visual, mechanical, or other output to a user. Some example visual outputs that may be provided to a user by circuitry 1800 are discussed in connection with FIGS. 1-3. As such, input/output module 1808 may include support, for example, for a keyboard, a mouse, a joystick, a display, a touch screen display, a microphone, a speaker, a RFID reader, barcode reader, biometric scanner, and/or other input/output mechanisms. In embodiments wherein circuitry 1800 is embodied as a server or database, aspects of input/output module 1808 may be reduced as compared to embodiments where circuitry 1800 is implemented as an end-user machine or other type of device designed for complex user interactions. In some embodiments (like other components discussed herein), input/output module 1808 may even be eliminated from circuitry 1800. Alternatively, such as in embodiments wherein circuitry 1800 is embodied as a server or database, at least some aspects of input/output module 1808 may be embodied on an apparatus used by a user that is in communication with circuitry 1800. Input/output module 1808 may be in communication with the memory 1804, communications module 1806, and/or any other component(s), such as via a bus. Although more than one input/output module and/or other component can be included in circuitry 1800, only one is shown in FIG. 18 to avoid overcomplicating the drawing (like the other components discussed herein).

Universal relevance service module 1810 may also or instead be included and configured to perform the functionality discussed herein related to the universal relevance service discussed above. In some embodiments, some or all of the functionality of a universal relevance service may be performed by processor 1802. In this regard, the example processes and algorithms discussed herein can be performed by at least one processor 1802 and/or universal relevance service module 1810. For example, non-transitory computer readable media can be configured to store firmware, one or more application programs, and/or other software, which include instructions and other computer-readable program code portions that can be executed to control each processor (e.g., processor 1802 and/or universal relevance service module 1810) of the components of system 100 to implement various operations, including the examples shown above. As such, a series of computer-readable program code portions are embodied in one or more computer program products and can be used, with a computing device, server, and/or other programmable apparatus, to produce machine-implemented processes.

Any such computer program instructions and/or other type of code may be loaded onto a computer, processor or other programmable apparatus's circuitry to produce a machine, such that the computer, processor other programmable circuitry that execute the code on the machine create the means for implementing various functions, including those described herein.

It is also noted that all or some of the information presented by the example displays discussed herein can be based on data that is received, generated and/or maintained by one or more components of system 100. In some embodiments, one or more external systems (such as a remote cloud computing and/or data storage system) may also be leveraged to provide at least some of the functionality discussed herein.

As described above in this disclosure, aspects of embodiments of the present invention may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Embodiments of the present invention have been described above with reference to block diagrams and flowchart illustrations of methods, apparatuses, systems and computer program products. It will be understood that each block of the circuit diagrams and process flow diagrams, and combinations of blocks in the circuit diagrams and process flowcharts, respectively, can be implemented by various means including computer program instructions. These computer program instructions may be loaded onto a general purpose computer, special purpose computer, or other programmable data processing apparatus, such as processor 1802 and/or universal relevance service module 1810 discussed above with reference to FIG. 18, to produce a machine, such that the computer program product includes the instructions which execute on the computer or other programmable data processing apparatus create a means for implementing the functions specified in the flowchart block or blocks.

These computer program instructions may also be stored in a computer-readable storage device (e.g., memory 1804) that can direct a computer or other programmable data processing apparatus to function in a particular manner, such that the instructions stored in the computer-readable storage device produce an article of manufacture including computer-readable instructions for implementing the function discussed herein. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions discussed herein.

Accordingly, blocks of the block diagrams and flowchart illustrations support combinations of means for performing the specified functions, combinations of steps for performing the specified functions and program instruction means for performing the specified functions. It will also be understood that each block of the circuit diagrams and process flowcharts, and combinations of blocks in the circuit diagrams and process flowcharts, can be implemented by special purpose hardware-based computer systems that perform the specified functions or steps, or combinations of special purpose hardware and computer instructions Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A computer-implemented method for calculating a user-deal relevance score, the method comprising:
    generating one or more trained machine learning models based at least in part on supervised learning models and training data, the one or more trained machine learning models configured for generating a user-deal relevance score based at least in part on one or more feature vectors associated with user-deal interaction data associated with a particular user;
    receiving, using at least one processor and via a relevance service application programming interface (API) from a relevance API client device, a search request generated on behalf of the particular user for deals describing promotion offerings that are currently available to the particular user;
    in response to receiving the search request, retrieving, using the at least one processor and from a data store, a set of join tables including user-interaction data describing user-deal interactions for the particular user and a particular deal;
    transforming, using the at least one processor, the set of join tables into a plurality of feature vectors;
    calculating, using the at least one processor and the set of join tables, a set of features including odds, DDO, and similarity, wherein odds comprises historical conversion data computed from jointed user and deal attributes, wherein DDO comprises past deal performance based on mapping an individual deal's performance data to all users similar to the particular user, and wherein similarity comprises a likelihood that the particular user is going to purchase deals similar to the particular deal;
    generating, using the at least one processor, the user-deal relevance score based at least in part on applying the one or more trained machine learning models to the plurality of feature vectors and on the set of features, wherein calculating the user-deal relevance score is based on a linear model derived from similarity, blended odds, and DDO features, and wherein calculating the blended odds and DDO features is based on Bayesian blending of odds and DDO features in user-deal space; and
    in an instance where a ratio of a click likelihood for the particular user to an average click likelihood exceeds a predefined number,
        adjusting, using the at least one processor, the user-deal relevance score based at least in part on the ratio;
        generating, using the at least one processor and based at least on the adjusted user-deal relevance score, a list of ranked deals for presentation via an electronic interface of a user device associated with the particular user; and
        transmitting, using the at least one processor and to the user device, one or more deals from the list of ranked deals configured for display within the electronic interface of the user device.

2. The method of claim 1, wherein the calculating of the blended odds and DDO features based on Bayesian blending of odds and DDO in user-deal space comprises:
    estimating, using the at least one processor, n prior events were generated by users during a particular time period;
    collecting, using the at least one processor, m actual events that were generated by the particular user during the particular time period; and
    calculating, using the at least one processor, a posterior estimation based on a weighted average of the n prior events and the m actual events.

3. The method of claim 2, further comprising:
    in an instance in which there is insufficient data to enable odds calculation, using the at least one processor, rolling up the data to a higher level of organization.

4. The method of claim 3, wherein rolling up the data to a higher level of organization follows the structure of an odds decision tree.

5. The method of claim 2, further comprising:
    for each of the particular user's attributes, determining, using the at least one processor, whether there is sufficient data describing the attribute to calculate DDO; and
    using the attribute to calculate, using the at least one processor, DDO in an instance in which there is sufficient data describing the attribute.

6. The method of claim 5, wherein determining whether there is sufficient data describing the attribute to calculate DDO comprises:
    using, by the at least one processor, a Two-One-Sided-Test (TOST) to test equivalence.

7. The method of claim 1, wherein data describing user and deal attributes are represented in a set of join tables, and wherein calculating similarity for the particular user and the particular deal comprises:
    generating, using the at least one processor, an extended user attribute vector in user-deal space, wherein the generating is based on a user vector representing the particular user's attributes and a projected user vector representing the user vector projection into deal space;
    generating, using the at least one processor, an extended deal attribute vector in user-deal space, wherein the generating is based on a deal vector representing the particular deal's attributes and a projected deal vector representing the deal vector projection into user space; and
    calculating, using the at least one processor, similarity for the particular user and the particular deal by taking the dot product of the extended user attribute vector and the extended deal attribute vector.

8. The method of claim 7, wherein calculating the user-deal relevance score is based on incorporating DDO and odds into similarity, and wherein incorporating DDO and odds into similarity comprises:
    generating, using the at least one processor, user-deal space evidence based on a projection of the particular user's attributes into deal space;
    blending, using the at least one processor, the user-deal space evidence with the projected user vector;
    generating, using the at least one processor, deal-user space evidence based on a projection of the particular deal's attributes into user space;

blending, using the at least one processor, the deal-user space evidence with the projected deal vector; and calculating, using the at least one processor, similarity for the particular user and the particular deal by taking the dot product of the blended vectors.

9. The method of claim 1, wherein calculating the user-deal relevance score is based on multiple models including at least one of a linear model and a machine-learning model.

10. A computer program product, stored on a computer readable medium, comprising instructions that when executed on one or more computers cause the one or more computers to:

generate one or more trained machine learning models based at least in part on supervised learning models and training data, the one or more trained machine learning models configured for generating a user-deal relevance score based at least in part on one or more feature vectors associated with user-deal interaction data associated with a particular user;

receive, via a relevance service application programming interface (API) from a relevance API client device, a search request generated on behalf of a particular user for deals describing promotion offerings that are currently available to the particular user;

in response to receiving the search request, retrieve, from a data store, a set of join tables including user-interaction data describing user-deal interactions for the particular user and a particular deal;

transform, the set of join tables into a plurality of feature vectors;

calculate, using the set of join tables, a set of features including odds, DDO, and similarity, wherein odds comprises historical conversion data computed from jointed user and deal attributes, wherein DDO comprises past deal performance based on mapping an individual deal's performance data to all users similar to the particular user, and wherein similarity comprises a likelihood that the particular user is going to purchase deals similar to the particular deal;

generate the user-deal relevance score based at least in part on applying the one or more trained machine learning models to the plurality of feature vectors and on the set of features, wherein calculating the user-deal relevance score is based on a linear model derived from similarity, blended odds, and DDO features, and wherein calculating the blended odds and DDO features is based on Bayesian blending of odds and DDO features in user-deal space;

in an instance where a ratio of a click likelihood for the particular user to an average click likelihood exceeds a predefined number,
  adjust the user-deal relevance score based at least in part on the ratio;
  generate, based at least on the adjusted user-deal relevance score, a list of ranked deals for presentation via an electronic interface of a user device associated with the particular user; and
  transmit, to the user device, one or more deals from the list of ranked deals configured for display within the electronic interface of the user device.

11. The computer program product of claim 10, wherein calculating the user-deal relevance score is based on a linear model of similarity, odds, and DDO features.

12. The computer program product of claim 10, wherein the calculating of the blended odds and DDO features based on Bayesian blending of odds and DDO in user-deal space comprises:

estimating n prior events were generated by users during a particular time period;

collecting m actual events that were generated by the particular user during the particular time period; and calculating a posterior estimation based on a weighted average of the n prior events and the m actual events.

13. The computer program product of claim 12, wherein the one or more computers is further caused to:
  in an instance in which there is insufficient data to enable odds calculation,
  roll up the data to a higher level of organization.

14. The computer program product of claim 13, wherein rolling up the data to a higher level of organization follows the structure of an Odds decision tree.

15. The computer program product of claim 12, wherein the one or more computers is further caused to:
  for each of the particular user's attributes, determine whether there is sufficient data describing the attribute to calculate DDO; and
  use the attribute to calculate DDO in an instance in which there is sufficient data describing the attribute.

16. The computer program product of claim 15, wherein determining whether there is sufficient data describing the attribute to calculate DDO comprises:
  using a Two-One-Sided-Test (TOST) to test equivalence.

17. The computer program product of claim 10, wherein data describing user and deal attributes are represented in a set of join tables, and wherein calculating similarity for the particular user and the particular deal comprises:

generating an extended user attribute vector in user-deal space, wherein the generating is based on a user vector representing the particular user's attributes and a projected user vector representing the user vector projection into deal space;

generating an extended deal attribute vector in user-deal space, wherein the generating is based on a deal vector representing the particular deal's attributes and a projected deal vector representing the deal vector projection into user space; and calculating similarity for the particular user and the particular deal by taking the dot product of the extended user attribute vector and the extended deal attribute vector.

18. The computer program product of claim 17, wherein calculating the user-deal relevance score is based on incorporating DDO and odds into similarity, and wherein incorporating DDO and odds into similarity comprises:

generating user-deal space evidence based on a projection of the particular user's attributes into deal space;

blending the user-deal space evidence with the projected user vector;

generating deal-user space evidence based on a projection of the particular deal's attributes into user space;

blending the deal-user space evidence with the projected deal vector; and calculating similarity for the particular user and the particular deal by taking the dot product of the blended vectors.

19. The computer program product of claim 10, wherein calculating the user-deal relevance score is based on multiple models including at least one of a linear model and a machine-learning model.

* * * * *